United States Patent
Kodama et al.

(10) Patent No.: US 10,500,681 B2
(45) Date of Patent: Dec. 10, 2019

(54) ARC SPOT WELDING METHOD AND WELDING APPARATUS FOR WORKING THE SAME

(71) Applicant: NIPPON STEEL & SUMITOMO METAL CORPORATION, Tokyo (JP)

(72) Inventors: Shinji Kodama, Tokyo (JP); Seiji Furusako, Tokyo (JP); Yasunobu Miyazaki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 364 days.

(21) Appl. No.: 15/517,095

(22) PCT Filed: Oct. 6, 2015

(86) PCT No.: PCT/JP2015/078387
§ 371 (c)(1),
(2) Date: Apr. 5, 2017

(87) PCT Pub. No.: WO2016/056563
PCT Pub. Date: Apr. 14, 2016

(65) Prior Publication Data
US 2017/0297151 A1     Oct. 19, 2017

(30) Foreign Application Priority Data
Oct. 6, 2014   (JP) ................. 2014-205891

(51) Int. Cl.
*B23K 9/28* (2006.01)
*B23K 37/06* (2006.01)
*B23K 9/007* (2006.01)
*B23K 9/02* (2006.01)
(Continued)

(52) U.S. Cl.
CPC .............. *B23K 37/06* (2013.01); *B23K 9/007* (2013.01); *B23K 9/0035* (2013.01); *B23K 9/02* (2013.01)

(58) Field of Classification Search
CPC ...... B23K 37/06; B23K 9/0035; B23K 9/007; B23K 9/02; B23K 9/04; B23K 9/042;
(Continued)

(56) References Cited

U.S. PATENT DOCUMENTS 3,449,543 A   6/1969 Sciaky
4,359,599 A   11/1982 Benner
(Continued)

FOREIGN PATENT DOCUMENTS

CN   102896398 A   1/2013
JP   59-215272 A   12/1984
(Continued)

OTHER PUBLICATIONS

International Search Report (Form PCT/ISA/210) issued in International Application No. PCT/JP2015/078387, dated Jan. 12, 2016.

*Primary Examiner* — Hung D Nguyen
(74) *Attorney, Agent, or Firm* — Birch, Stewart, Kolasch & Birch, LLP

(57) ABSTRACT

An arc spot welding method able to give a predetermined weld bead diameter or excess metal height in a back surface weld bead of arc spot welding and able to give a welded joint excellent in both strengths of TSS and CTS and a welding apparatus for working the same are provided. Steel sheets containing carbon in 0.2 mass % or more and having sheet thicknesses "t" or more are arranged overlaid. A backing plate including a non-contact part and a contact part maintaining the back surface of the lower side steel sheet is provided. An arc generation and short-circuit conduction where the welding voltage between the welding wire and upper side steel sheet becomes 10V or less are alternately repeated so that the time period of the short-circuit conduction becomes over 30% to less than 60% per cycle to thereby weld the steel sheets.

20 Claims, 14 Drawing Sheets

(51) Int. Cl.
  *B23K 9/00* (2006.01)
  *B23K 11/10* (2006.01)

(58) Field of Classification Search
  CPC ...... B23K 9/0671; B23K 9/0737; B23K 9/09;
    B23K 9/0901; B23K 9/092; B23K
    9/0953; B23K 9/1093; B23K 9/124;
    B23K 9/125; B23K 9/173
  USPC .. 219/617, 86.1, 86.21, 86.22, 86.23, 86.24,
    219/86.25, 90, 91.1, 91.2, 91.21–91.23,
    219/101, 104, 108, 110, 111, 117.1,
    219/121.11, 136, 137, 137.7, 137.71
  See application file for complete search history.

(56) References Cited

U.S. PATENT DOCUMENTS

| | | | | |
|---|---|---|---|---|
| 5,270,516 A | * | 12/1993 | Hamamoto | .......... B23K 9/0956 |
| | | | | 219/130.21 |
| 2008/0156781 A1 | * | 7/2008 | Artelsmair | ............. B23K 9/091 |
| | | | | 219/130.5 |
| 2009/0114631 A1 | * | 5/2009 | Chevalier | .............. B23K 9/124 |
| | | | | 219/137.7 |
| 2009/0302014 A1 | | 12/2009 | Åberg | |
| 2010/0126976 A1 | * | 5/2010 | Kawamoto | .......... B23K 9/0953 |
| | | | | 219/125.1 |
| 2015/0090703 A1 | * | 4/2015 | Peters | ...................... B23K 9/02 |
| | | | | 219/130.21 |
| 2016/0158865 A1 | | 6/2016 | Furusako et al. | |

FOREIGN PATENT DOCUMENTS

| | | |
|---|---|---|
| JP | 2-59173 A | 2/1990 |
| JP | 5-104250 A | 4/1993 |
| JP | 6-39542 A | 2/1994 |
| JP | 8-155645 A | 6/1996 |
| JP | 2009-507646 A | 2/2009 |
| JP | 2013-10139 A | 1/2013 |
| WO | WO 2015/016287 A1 | 2/2009 |

* cited by examiner

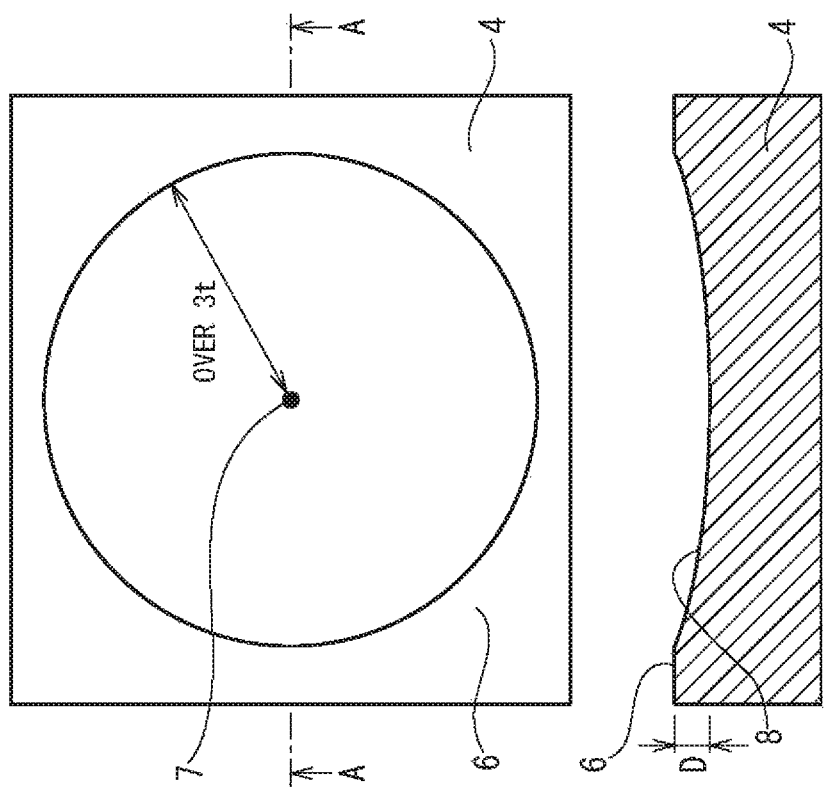
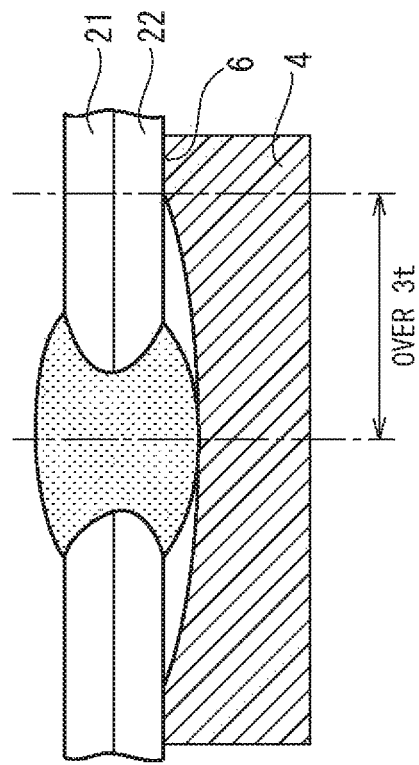
FIG. 8A
FIG. 8B

ARC SPOT WELDING METHOD AND WELDING APPARATUS FOR WORKING THE SAME

TECHNICAL FIELD

The present invention relates to a method for arc spot welding overlaid parts of thin-gauge steel sheets made of high strength steel and to a welding apparatus for working the same.

BACKGROUND ART

In recent years, in the automotive field, to lighten the weight of car bodies and improve safety in impact, the utilization of high strength steel sheets increases. The strength of the steel sheets used has also increasingly risen. In the process of assembly of the car bodies made of such high strength steel, attachment of parts, etc., spot welding using resistance welding has mainly been used.

The bonding strength of a spot welded part is evaluated by the tensile shear strength (TSS) measured by applying a tensile load in the shear direction and by the cross tensile strength (CTS) measured by applying a tensile load in the peel-off direction. It is known that this TSS and CTS change by the relations such as shown in FIG. 16 together with the increase of the tensile strength of the steel sheet. That is, the TSS is improved along with the rise of the tensile strength of the steel sheets, while the CTS becomes saturated at a tensile strength of the steel sheets of around 590 MPa and conversely falls along with the tensile strength of the steel sheets becoming higher than that tensile strength.

When spot welding high strength steel sheets with a tensile strength of over 590 MPa, a drop in the toughness and ductility of the nuggets arises along with a rise in the hardenability of the base metal steel sheet s. Further, when applying a peel-off load such as CTS in spot welding, the higher the strength of the steel sheets, the easier it is for the stress to concentrate at the ends of the weld metal (nuggets). Furthermore, when the pressing force is high or when scattering occurs, the thickness of the steel sheets at a spot welded part becomes thinner compared with the surroundings and the stress level ends up rising more compared with the applied load. Due to these, in spot welding, when the strength of the steel sheets is high, the CTS of the weld zone falls.

As opposed to this, in arc spot welding, it is possible to weld through the steel sheets and form an excess buildup part at the weld metal, so it is possible to obtain a higher strength of joint than the utilization of spot welding.

PLT 1 discloses an arc spot welded joint obtained by making the overlaid high strength steel sheets melt to the back surface side, forming weld beads so as to stick out from the surfaces of the steel sheets, and controlling the bead diameters to suitable ranges in relation to the thicknesses of the steel sheets so as to obtain both high CTS and TSS and realize a welded joint excellent in strength of joint.

However, the weld bead shapes change along with the chemical ingredients of the steel material, thickness of the steel material, etc. Furthermore, the weld bead of the back surface droops down due to the effect of gravity, so it is difficult to stably control the weld bead shape.

As the means for suppressing drooping of the back surface bead, PLT 2 discloses the method of using backing plate. PLT 2 proposes to prevent melt fusion of the backing plate and weld metal by the method of providing a recess at the front surface part of the backing plate to suppress the generation of an arc discharge to the backing plate.

FIG. 1 of PLT 2 describes that a weld bead of the same size as the recess of the backing plate is formed at the back side of the overlaid steel sheet. However, the inventors tried using the backing plate disclosed in PLT 2 to control the back surface bead shape at the time of arc spot welding, but it was not possible to obtain a weld bead diameter or excess metal height such as disclosed in PLT 1.

FIG. 2 of PLT 3 discloses an apparatus with a recessed gas supply groove provided with a width able to form the atmosphere at the time of arc welding, discharge the resin gas produced when butting and welding two vibration-damping steel sheets, and cool the back surface near the weld zone of the two vibration-damping steel sheets so as to be able to cool the vicinity of the end edges of the weld zone of the two vibration-damping steel sheets.

Further, FIG. 3 etc. of PLT 4 discloses an apparatus placing two steel sheets overlaid on a receiving table and performing arc spot welding.

However, neither PLT 3 nor 4 discloses a specific method for control of the buildup height of a weld bead or rest of the shape of a weld bead. For this reason, it is not self evident whether the above-mentioned apparatus has the functions enabling formation of a bead shape necessary for raising the strength of the weld zone.

CITATION LIST

Patent Literature

PLT 1: Japanese Patent Publication No. 2013-010139A
PLT 2: Japanese Patent Publication No. 06-039542A
PLT 3: Japanese Patent Publication No. 5-104250A
PLT 4: Japanese Patent Publication No. 2-59173A

SUMMARY OF INVENTION

Technical Problem

Therefore, the present invention was made in consideration of such a situation and has as its object to provide an arc spot welding method able to give a predetermined weld bead diameter or excess metal height in a back surface weld bead in arc spot welding and able to give a welded joint excellent in both strengths of TSS and CTS and to provide a welding apparatus for working the same.

Solution to Problem

The inventors obtained the discovery that if welding while providing a backing plate at the steel sheet back surface, growth of the melted region is inhibited due to the heat removal by the backing plate. Therefore, to enlarge the back surface weld bead of the steel sheet, the inventors studied the method of suppressing the transmission of heat from the steel sheet back surface to the backing plate near the melted region and as a result discovered to limit the contact position of the backing plate and steel sheet back surface near the melted region so that a clearance is formed between the welded part and the backing plate.

Further, in addition to gravity due to the mass of the molten metal itself, the pressure due to the blowing pressure of the stream of arc plasma at the time of arc welding, that is, the arc pressure, has an effect on the extent of drooping of the back surface bead. Therefore, the inventors discovered that it is possible to keep the ratio of the arc generation time in the arc welding time to within a certain range to lighten the average arc pressure at the time of arc welding and is possible to prevent fall off of the weld metal at the start of the arc spot welding and thereby completed the present invention.

The gist of the present invention is as follows:

(1) An arc spot welding method arranging a plurality of steel sheets containing carbon in amounts of 0.2 mass % or more overlaid and performing lap welding while arranging a backing plate in contact with a lower side steel sheet at an opposite side to a welding torch, the backing plate comprising a non-contact part and a contact part, wherein the non-contact part faces said lower side steel sheet without contacting said lower side steel sheet and the contacting part contacts the lower side steel sheet, the arc spot welding method comprising arranging the backing plate so that the contact part contacts the lower side steel sheet at a position exceeding 3 t from a circle equivalent center of a back surface weld bead and alternately and continuously repeating arc generation and short-circuit conduction so that a short-circuiting time where a welding voltage becomes 10V or less becomes over 30% to less than 60% per conduction cycle, where "t" is defined as the sheet thickness of the steel sheet with the thinnest sheet thickness among the plurality of steel sheets.

(2) The arc spot welding method according to (1), wherein a value of a mean welding voltage (unit: V)/mean welding current (unit: A) in an arc spot welding time period of alternately and continuously repeating arc generation and short-circuit conduction is 0.07 to 0.10 (V/A).

(3) The arc spot welding method according to (1) or (2), wherein one cycle is made 5 msec to 20 msec and arc generation and short-circuit conduction are performed during that cycle.

(4) The arc spot welding method according to any one of (1) to (3), wherein the contact part maintains a clearance between a back surface of the lower side steel sheet and the non-contact part at 0.2 t to 3 t.

(5) The arc spot welding method according to any one of (1) to (4), forming a back surface weld bead having a weld bead diameter of a circle equivalent diameter of 3 t to 10 t and having an excess metal height of 0.2 t to 3 t.

(6) The arc spot welding method according to any one of (1) to (5), wherein the contact between the contact part and a back surface of the lower side steel sheet is at least one of point contact, line contact, and planar contact.

(7) The arc spot welding method according to any one of (1) to (6), wherein when forming a back surface weld bead with a circle equivalent weld bead diameter of the back surface weld bead of over 5 t, the backing plate is formed by copper or a copper alloy and the contact between the contact part and a back surface of the lower side steel sheet is planar contact.

(8) The arc spot welding method according to any one of (1) to (6), wherein when forming a back surface weld bead with a circle equivalent weld bead diameter of the back surface weld bead of over 5 t, the backing plate is formed by a steel material and the contact between the contact part and a back surface of the lower side steel sheet is planar contact.

(9) The arc spot welding method according to any one of (1) to (8), wherein a contact area of the contact part and a back surface of the lower side steel sheet is 10 $cm^2$ or less.

(10) An arc spot welding apparatus working an arc spot welding method according to any one of (1) to (9), the arc spot welding apparatus having a backing plate provided with a non-contact part arranged separated from a back surface of the lower side steel sheet and a contact part contacting the back surface of the lower side steel sheet at a position of over 3 t from the circle equivalent center of the back surface weld bead and maintaining a clearance of 0.2 t to 3 t between the back surface of the lower side steel sheet and the non-contact part.

(11) The arc spot welding apparatus according to (10), wherein the arc spot welding apparatus is a welding robot at which a welding torch and the backing plate are mounted.

Advantageous Effects of Invention

According to the present invention, even in welding of high strength steel sheets of various chemical compositions, an arc spot welded joint excellent in both TSS and CTS is obtained without reduction of the toughness or ductility of the weld zone, so by applying the present invention in the process of manufacture of auto parts or assembly of car bodies etc., members more excellent in strength can be produced and safety of automobiles etc. can be improved.

BRIEF DESCRIPTION OF DRAWINGS

FIGS. 6A and 6B are views showing one example of presence/absence of a through hole at the welding location of an upper side steel sheet, wherein FIG. 6A is a view showing the presence of a through hole while FIG. 6B is a view showing the absence of a through hole.

FIGS. 7A and 7B are views showing one example of a backing plate with a recess of a box shape as seen from the vertical cross-section, wherein FIG. 7A is a plan view and vertical cross-sectional view of the backing plate and FIG. 7B is a view showing a cross-sectional view after arc spot welding using the backing plate of FIG. 7A.

FIGS. 8A and 8B are views showing one example of a backing plate with a semispherical recess, wherein FIG. 8A is a plan view and vertical cross-sectional view of the backing plate and FIG. 8B is a view showing a cross-sectional view after arc spot welding using the backing plate of FIG. 8A.

FIGS. 9A and 9B are views showing one example of a backing plate, wherein FIG. 9A is a plan view and side view of a backing plate having a contact part contacting the steel sheet back surface by point contact and FIG. 9B is a plan view and a vertical cross-sectional view of a backing plate having a contact part contacting the steel sheet back surface by line contact.

FIGS. 10A and 10B are views showing one example of a backing plate having a contact part contacting the steel sheet back surface by planar contact, wherein FIG. 10A is a plan view and vertical cross-sectional view of a backing plate having a contact part with a rectangular contact surface and FIG. 10B is a plan view and vertical cross-sectional view of a backing plate having a contact part with a rectangular contact surface having a recess.

DESCRIPTION OF EMBODIMENTS

Figure 1:
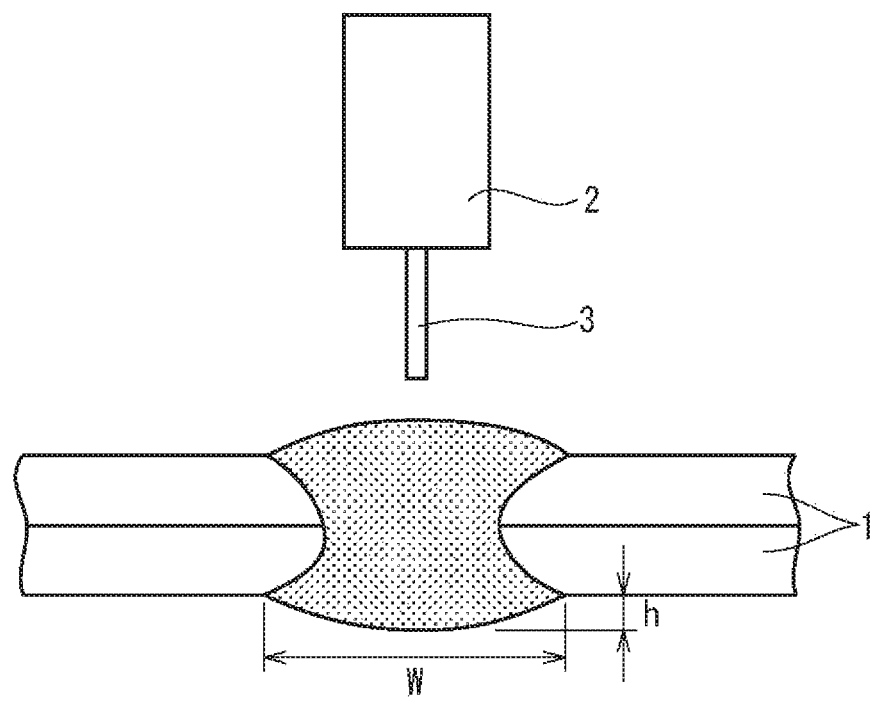
FIG. 1 is a view showing one example of an arc spot welding method according to gas metal arc welding.

FIG. 1 is a view showing one example of the arc spot welding method according to gas metal arc welding. In this way, the arc spot welding method is the method of overlaying two steel sheets 1 to be welded, generating an arc from a welding wire 3 of a gas metal arc welding torch 2 arranged vertical or substantially vertical to the sheet surfaces, and feeding welding wire 3 while welding the two steel sheets together. To secure a suitable weld zone strength, it is necessary to form a predetermined weld bead diameter W and excess metal height "h".

In the above-mentioned arc spot welding method, the present invention has as a requirement limiting the position of contact between the contact part of the backing plate and the back surface of the lower side steel sheet when arranging the backing plate at the back surface of the lower side steel sheet and welding from the front surface of the upper side steel sheet on condition that the steel sheet at the welding torch side is the upper side steel sheet and the surface at the welding torch side is the front surface.

Further, in addition to the above requirement, the present invention has as a requirement keeping the ratio of the arc generation time and short-circuiting time at the time of arc welding within a certain range and thereby reducing the mean arc pressure at the time of the arc welding.

The present invention is made one which can give a predetermined back surface weld bead diameter and excess metal height and can give a welded joint excellent in both TSS and CTS by the above two requirements.

Below, the arc spot welding method of the present invention will be explained in detail referring to the drawings:

[Condition of Contact Position of Contact Part of Backing Plate and Back Surface of Lower Side Steel Sheet]

The inventors studied the phenomenon of the formation of a back surface weld bead in the case of performing arc spot welding on steel sheets of a sheet thickness of 2 mm containing 0.3% C, where it is considered weld metal easily melts off. Here, the targeted weld bead diameter was made 10 mm (5 t) and the excess metal height was made 1 mm (t/2).

Figure 2:
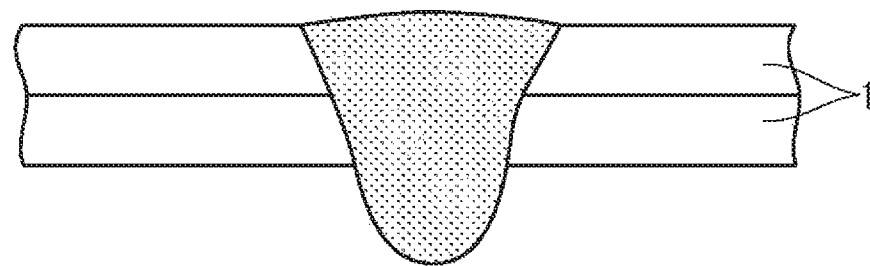
FIG. 2 is a view showing one example of an arc spot welding method not using a backing plate.

First, the inventors studied the shape of the back surface weld bead in the case of performing arc spot welding without using a backing plate. FIG. 2 is a view showing an example of an arc spot welding method not using a backing plate. If performing arc spot welding without using a backing plate in this way, if trying to make both steel sheets sufficiently melt, the back surface weld bead greatly drooped down and the targeted excess metal height could not be obtained.

Next, the inventors studied the shape of the back surface weld bead in the case of performing arc spot welding using various shapes of backing plates.

Figure 3:
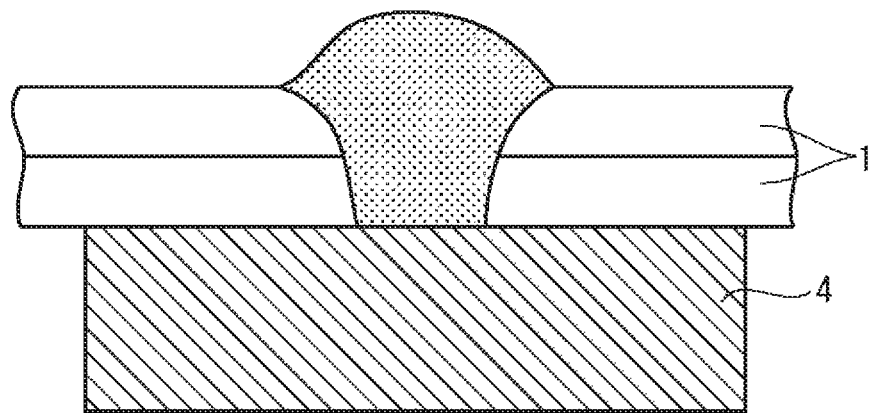
FIG. 3 is a view showing one example of an arc spot welding method using a backing plate with no recess.

FIG. 3 is a view showing one example of an arc spot welding method using a backing plate with no recess. If in this way making the backing plate 4 with no recess closely contact the lower side steel sheet back surface and performing arc spot welding, the back surface weld bead could not droop down and the targeted excess metal height could not be obtained. Further, due to the effect of heat removal by the backing plate, the diameter of the back surface weld bead became smaller.

Figure 4:
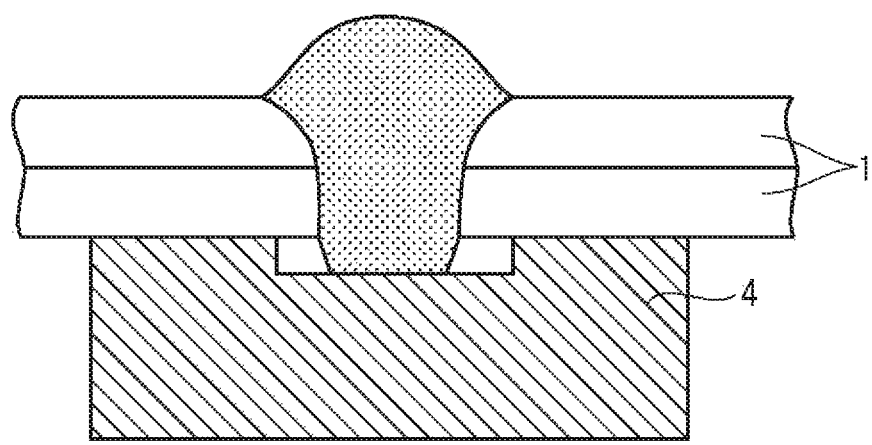
FIG. 4 is a view showing one example of an arc spot welding method using a backing plate with a recess.

FIG. 4 is a view showing one example of an arc spot welding method using a backing plate with a recess. FIG. 4 shows the example of designing a suitable back surface weld bead shape by making the diameter of the recess of the backing plate 4 10 mm and making the depth 1 mm. If making a backing plate 4 with such a recess closely contact the lower side steel sheet back surface and performing arc spot welding, the excess metal height increased to about 1 mm and the targeted excess metal height was obtained. However, due to the effect of heat removal by the backing plate, the back surface weld bead diameter remained a small one of about 4 mm.

Figure 5:
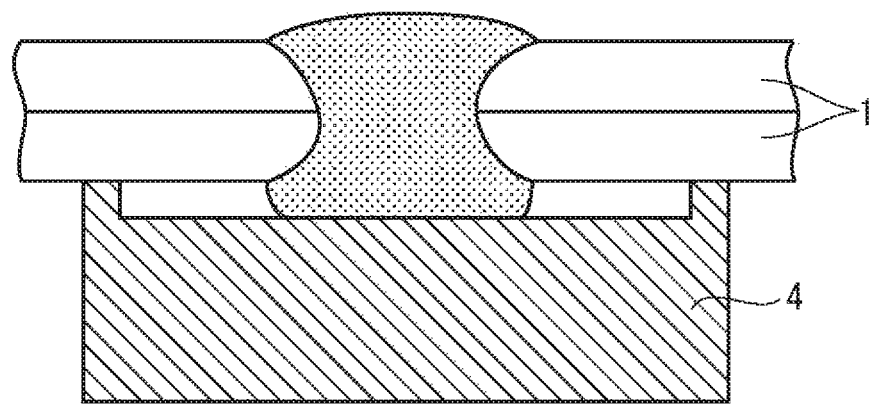
FIG. 5 is a view showing one example of an arc spot welding method using a backing plate enlarging the diameter of the recess.

FIG. 5 is a view showing one example of an arc spot welding method using a backing plate enlarging the diameter of the recess. FIG. 5 enlarges the diameter of the recess of the backing plate to 15 mm so as to reduce the contact area between the backing plate 4 and the lower side steel sheet back surface, suppress heat removal by the backing plate 4, and enlarge the diameter of the back surface weld bead. If bringing the backing plate 4 with such a recess into close contact with the lower side steel sheet back surface and then performing arc spot welding, the targeted weld zone shape with the back surface weld bead diameter of 10 mm or so and the excess metal height of 1 mm or so was obtained.

In this way, the targeted back surface weld bead shape was obtained not due to the provision of the recess at the backing plate, but due to the enlargement of the diameter of the recess and because the heat removal by the backing plate near the melted region was suppressed. This being so, in order to suppress heat removal of the backing plate, it may be considered to make the backing plate and the lower side steel sheet back surface not contact each other. However, in order to support the steel sheets and position the backing plate, it is necessary to make the backing plate and lower side steel sheet back surface contact each other. Therefore, it is effective to place the backing plate so as to make the contact part of the backing plate and lower side steel sheet back surface contact at a position separated from the back surface weld bead and keep down heat removal by the backing plate.

Summarizing the results of the studies above, the following can be said.

By placing the backing plate so that the contact part of the backing plate contacts the steel sheet back surface at a position at the outside from the targeted back surface weld bead, that is, a position of the circle equivalent diameter (W) or so or more away from the targeted circle equivalent center of the back surface weld bead, it is possible to obtain the targeted back surface weld bead shape. In this regard, the diameter of the back surface weld bead targeted in this arc spot welding method is 3 to 10 t in range with respect to the sheet thickness "t" (mm) (in the case where the sheet thicknesses of two or more steel sheets differ, the sheet thickness of the thinner steel sheet of the front side steel sheet or back side steel sheet being made "t"). For this reason, to realize the lower limit 3 t weld bead diameter, the contact part of the backing plate has to be set at a position exceeding at least 3 t from the circle equivalent center of the back surface weld bead.

[Arc Generation Conditions]

Figure 17:
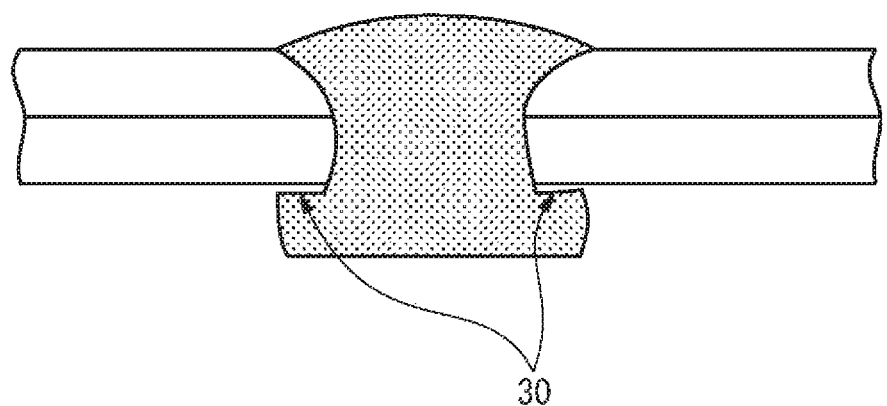
FIG. 17 is a schematic cross-sectional view showing the state where the back surface weld bead does not sufficiently fuse with the steel sheet back surface.

As explained above, by enlarging the diameter of the recess provided at the backing plate, heat removal of the backing plate near the melted region is suppressed and the back surface weld bead shape can be enlarged. However, depending on the welding conditions which are set, as shown in FIG. 17, the back surface weld bead will not sufficiently fuse with the steel sheet back surface and a poorly fused part 30 with an interface will be produced. In particular, if the clearance between the back surface of the overlaid lower side steel sheet and backing plate exceeds the thickness "t" of either steel sheet, such a poorly fused part will easily occur if performing the arc spot welding by the standard DC arc welding method or pulsed MAG welding method.

Figure 18:
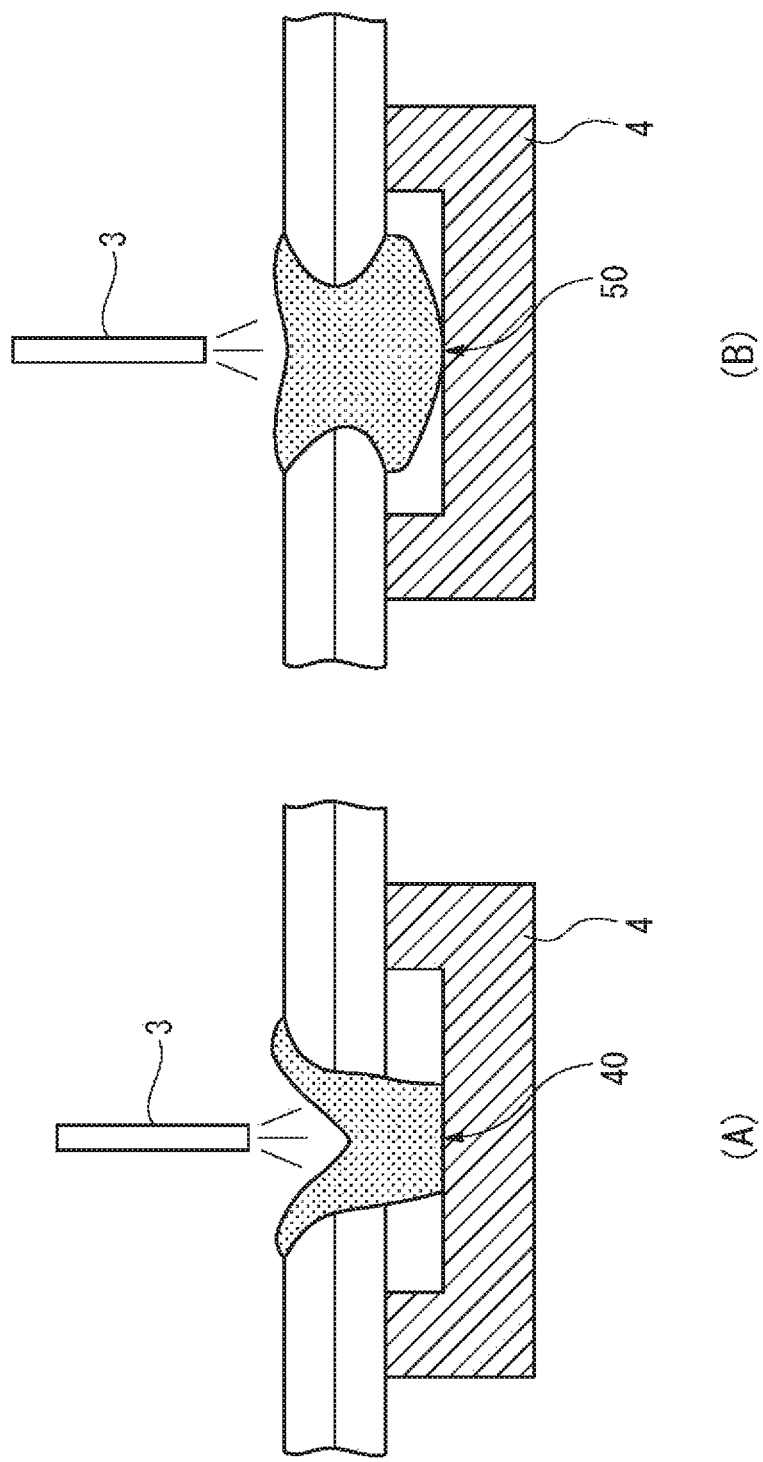
FIG. 18A is a schematic cross-sectional view showing the state where molten metal melts off from the steel sheet back surface and contacts the surface of the backing plate in accordance with the standard arc welding method and FIG. 18B is a schematic cross-sectional view showing the state where molten metal is prevented from melting off at the start of arc spot welding in accordance with the arc welding method of the present invention.

FIG. 18A is a cross-sectional view schematically showing the state of the welded part at the start of welding by the standard arc welding method. As shown in FIG. 18A, with the standard arc welding method, at the initial stage of the arc spot welding, the molten metal melts off from the steel sheet back surface and contacts the surface of the backing plate (reference notation 40) whereby the molten metal ends up being cooled by the backing plate. By doing this, even if the diameter of the back surface weld bead is enlarged, the back surface weld bead and the steel sheet back surface cannot be made to melt together, so a sufficient effect of improvement of the bonding strength cannot be obtained.

The melting off of the molten metal is influenced not only by the weight of the molten metal itself, but also the above-mentioned arc pressure. Therefore, it was thought that if reducing the ratio of the arc generation time in the arc welding process, the average arc pressure would be reduced and, as shown in FIG. 18B, melt off of the molten metal at the initial stage of arc spot welding could be prevented and the steel sheet back surface could be made to melt while enlarging the back surface weld bead diameter. In the case of FIG. 18B, the part of the backing plate which the molten metal contacts (reference notation 50) is kept to a minimum, so cooling of the molten metal can be prevented.

Figure 19:
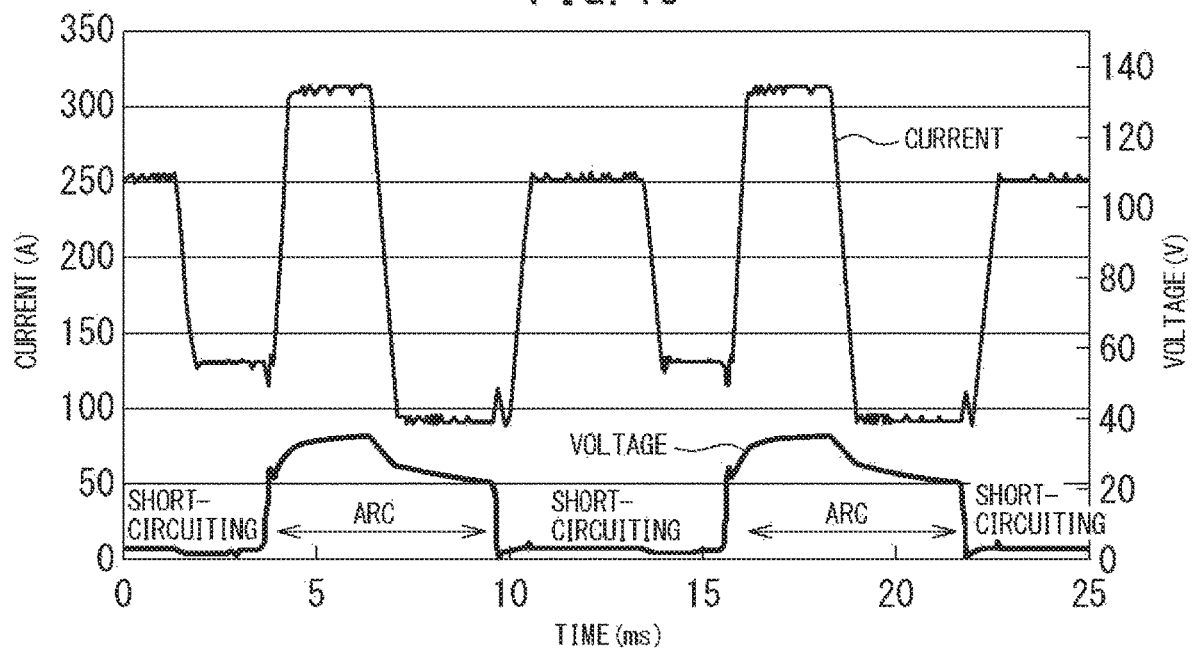
FIG. 19 is a graph showing the relationship between a voltage waveform and current waveform and an arc generation time and short-circuiting time in arc welding using a CMT power source.

To reduce the ratio of the arc generation time in the arc welding process, it is effective to proactively bring the welding wire and matrix material into contact and increase the short-circuiting time. As the means for this, use of a cold metal transfer power source (below, simply referred to as a "CMT power source") enabling control of the arc generation time and short-circuiting time at cycles of several tens of Hz was studied. The CMT power source, as shown in FIG. 19, performs arc welding while controlling the advance and retraction of the welding wire being fed. It enables arc generation and short-circuit conduction to be performed continuously and alternately in accordance with the set welding conditions and control of the ratio of the arc generation time and short-circuiting time. Further, the "short-circuiting time" means the time where the welding voltage becomes 10V or less.

Figure 20:
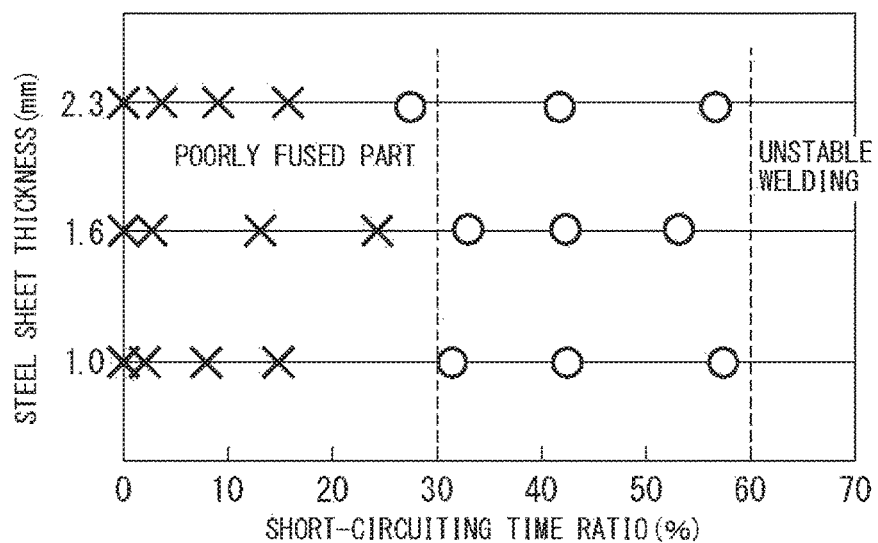
FIG. 20 is a graph showing the relationship between a short-circuit time ratio at the time of welding and the occurrence of a poorly fused part.

The inventors used the CMT power source to weld steel sheets of sheet thicknesses of 1.0 mm, 1.6 mm, and 2.3 mm by various methods and investigated the relationship between the short-circuit time ratio at the time of welding and the formation of poorly fused parts. The results are shown in FIG. 20. In FIG. 20, the "○" marks correspond to welding with a good molten state where fusion of the back surface weld bead and the steel sheet back surface together can be confirmed, while the "×" marks correspond to welding with a poor molten state where an interface can be confirmed between the back surface weld bead and the steel sheet back surface. Further, regarding FIG. 20, the welding at the "short-circuit time ratio=0(%)" was evaluated using the pulsed MAG welding, the welding in the range of "0(%)<short-circuit time ratio<30(%)" was evaluated using the short arc welding, and the welding in the range of "30(%)<short-circuit time ratio" was evaluated using CMT welding.

Further, the above-mentioned "short-circuit time ratio" means the ratio of the short-circuiting time in the arc generation time and short-circuiting time at one arc spot welding operation when alternately and continuously repeating arc generation between the welding wire and upper side steel sheet and short-circuit conduction where the welding voltage between the welding wire and upper side steel sheet becomes 10V or less. Further, the continuous alternating repetition of the arc generation and the short-circuit conduction without stopping is deemed "one arc spot welding operation" in the present invention.

As shown in FIG. 20, it was possible to form a weld zone with no poorly fused parts at the back surface weld bead by a short-circuit time ratio of 30% or more. However, if making the short-circuit time ratio 60% or more, the welding phenomenon itself becomes unstable and welding could not be performed. Accordingly, in the present invention, the short-circuit time ratio has to be set to over 30% to less than 60%.

From the viewpoint of the welding conditions, if the short-circuit time ratio increases, the ratio of the welding voltage to the welding current falls. If setting the welding current of the arc spot welding of the weldable members of the present invention to 150 A to 250 A in range, if the short-circuit time ratio is 20% or so or less, the welding voltage/welding current becomes 0.11 to 0.15 or so. As opposed to this, if setting the welding current to that range and setting the short-circuit time ratio to 30% or more, the welding voltage/welding current becomes 0.07 to 0.10 in range. In this way, to perform welding with no poorly fused parts, it is necessary to define the range of the welding voltage/welding current according to the set range of the short-circuit time ratio.

The inventors completed the invention described in the above (1) through the above such process of study. The present invention will be successively explained with regard to the necessary requirements and preferable requirements below.

[Weldable Members]

In the arc spot welding method of the present invention, as the weldable member comprising the steel sheet 1, steel sheet of any chemical composition can be used. In particular, in medium and high carbon steel sheet with a C content of 0.2 mass % or more, the molten metal easily droops down from the back surface of the overlaid steel sheets, so it is effective to use the present invention.

The types and chemical compositions of the weldable members comprised of high strength steel are not particularly limited. For example, dual-phase structure types (for example, structures containing ferrite and martensite and structures containing ferrite and bainite), deformation induced transformation types (structures containing ferrite and residual austenite), microcrystalline types (structures mainly comprised of ferrite), and any other types of steel sheets may be used. No matter what types of steels the high strength steel sheets are made of, application of the present invention enables arc spot welded joints excellent in both TSS and CTS to be obtained.

Regarding the sheet thickness of the steel sheets, steel sheets with a sheet thickness of at least the overlaid parts of 0.5 to 3.0 mm in range are covered. If the sheet thickness is less than 0.5 mm, the strength or rigidity as basic members cannot be secured. On the other hand, if the sheet thickness is over 3.0 mm, the objective of realizing both higher strength and thinner sheets cannot be realized.

The steel sheets which are combined are not limited to sheet members of the same steel types or the same sheet thicknesses. They may be suitably combined so long as satisfying the above requirement of the content of C and enabling arc spot welding. The number of sheets overlaid is not limited. Further, the steel sheets to be welded need not be sheet shaped as a whole. It is sufficient that at least the parts to be overlaid be sheet shaped. For example, a pressed part etc. obtained by forming steel sheet into a specific shape is included. Further, the invention is not limited to the case of overlaying separate steel sheets. It is also possible to form a single steel sheet into a tubular shape or other predetermined shape and overlay the end parts.

[Form of Overlay]

Figure 6:
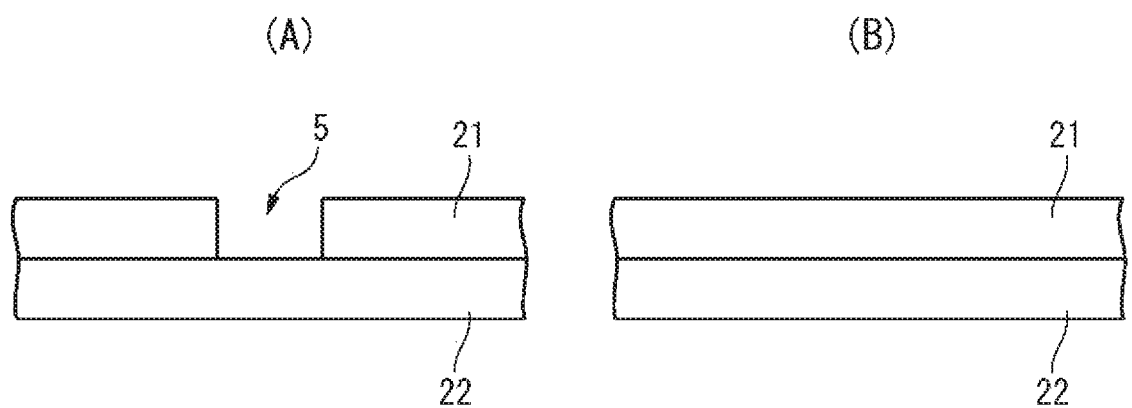

FIGS. 6A and 6B are views showing examples of the presence/absence of a through hole at the welding location of an upper side steel sheet. When joining the overlaid parts of two steel sheets by lap welding by arc spot welding, there are the method, as shown in FIG. 6A, of welding after forming a through hole 5 in advance at the welding location of the upper side steel sheet 21 facing the welding torch and the method, as shown in FIG. 6B, of welding by just overlay without formation of a hole. The present invention can be applied in any of these cases.

To make the sheets melt down to the overlaid lower side steel sheet 22 and form an excess buildup part of a sufficient thickness at the bottom surface (back surface), when the sheet thickness of the upper side steel sheet 21 facing the welding torch is 1.6 mm or more, a through hole 5 may be formed in advance at the welding location. If not forming the through hole 5, there are the problems that the welding time has to be made longer to make the weld input heat increase and the productivity falls. On the other hand, when the sheet thickness of the upper side steel sheet 21 is less than 1.6 mm, it is easy for the arc to pass through the steel sheet, so the through hole 5 is not particularly necessary. However, when it is particularly necessary to reduce the input heat, there is nothing stopping forming the through hole 5 even if the sheet thickness of the upper side steel sheet 21 is less than 1.2 mm.

To form the through hole 5, the ratio (D/t1) of the diameter D (mm) of the through hole 5 to the sheet thickness t1 (mm) of the upper side steel sheet 21 is made to become 10 or less. By this, it is possible to make the bead pass through to the back surface of the lower side steel sheet while enabling stable arc spot welding. If D/t1 exceeds 10, to make the end of the through hole 5 sufficiently melt, the torch has to rock back and forth by a large amplitude. For this reason, the welding time is liable to become longer and the weld input heat is liable to increase resulting in remarkable welding deformation. Alternatively, if not making the torch rock back and forth, the hole end is liable to remain unmelted and the CTS is liable to fall. Note that, to sufficiently obtain the effect of formation of the through hole 5, the value of D/t1 is preferably made 1 or more.

[Welding Process]

The routine for welding overlaid steel sheets will be explained divided into the case of there being a through hole 5 and the case of not. Further, the arc spot welding process may be performed by a single pass or divided into two passes. When performed by a single pass, the lower side steel sheet 22 is made to melt down to the back surface to form an excess buildup part of the height required for the back surface and the upper side steel sheet 21 is melted to form the upper side excess buildup part. When divided into two passes, a first welding pass is performed to form the first weld metal, next, after the surface of the first weld metal solidifies, a second welding pass is performed to form the second weld metal on the first weld metal in the same way.

(1) Case of Through Hole in Upper Side Steel Sheet

First, an arc is generated through the through hole 5 from the welding wire toward the front surface of the lower side steel sheet 22 to cause the lower side steel sheet 22 to melt down to the back surface and simultaneously bury the through hole 5 by molten metal and thereby obtain an arc spot welded joint.

(2) Case of No Through Hole in Upper Side Steel Sheet

The basic welding procedure and the conditions of the different welding passes are the same as the procedure and the conditions in the case of the through hole 5, but to make the upper side steel sheet 21 melt, compared with welding the same sheet thicknesses, it is necessary to raise the amount of input heat for welding over the case of forming the through hole 5.

For this reason, if the sheet thickness of the sheet members to be welded becomes thicker, the amount of input heat required for making the members melt down to the back surface will increase and welding deformation of the weld metal will sometimes become remarkable. Therefore, if not forming a through hole 5 at the upper side steel sheet 21, preferably the welding is performed by steel sheets of a relatively thin sheet thickness. Studies by the inventors confirm that if the total sheet thickness of the overlaid sheet members is about 3 mm or less, the targeted weld metal shape can be obtained over a broad range of input heat conditions.

[Welding Conditions]

Regarding the current and voltage conditions at the time of the arc spot welding, suitable conditions may be suitably employed in accordance with the thickness of the sheet members to be welded etc. so that when alternately performing arc generation and short-circuit conduction, the short-circuiting time between the welding wire and the upper side steel sheet becomes over 30% to less than 60%. Further, the type of the shield gas is also not particularly limited. The usual mixed gas of Ar and 30 vol % or less of $CO_2$ may be illustrated, but if the amount of mixture of $CO_2$ gas is made 2 to 20 vol %, it is in particular possible to keep the weld bead from drooping down and falling off, so the first welding pass preferably performs welding under such shield gas conditions.

The welding wire used for the arc spot welding is not particularly limited in chemical composition or diameter etc. For example, welding wire prescribed in JIS Z 3312 or JIS Z 3313 etc. or other conventionally known ones may be selected from and used so that a strong weld metal corresponding to the required strength of joint is formed.

[Bead Shape]

The circle equivalent diameter of the weld bead formed at the back surface (bead diameter) W is formed to a range of 3 t to 10 t (mm) with respect to the sheet thickness "t" (mm) so as to improve the cross tensile strength (CTS). Note that, when the sheet thicknesses of the plurality of sheet members which are overlaid are not the same, "t" is made the sheet thickness of the thinnest sheet member. If the weld bead diameter is less than 3 t, the bead is small and a strength of joint commensurate with the strength of the sheet members cannot be obtained. To secure strength, the bead diameter is preferably large. The weld bead is preferably formed so that the diameter W becomes 5 t or more. Further, with a size of this bead diameter exceeding 10 t, the welding time becomes longer. Due to the increase in the amount of input heat, the weld metal droops down and the welding deformation is liable to become remarkable.

The height "h" of the excess buildup part of the back surface weld bead is formed to 0.2 t (mm) to 3 t (mm) with respect to the sheet thickness "t" (mm) of the steel sheets. If the height of the excess buildup part is less than 0.2 t, the excess buildup part is low and a sufficient strength of joint cannot be obtained. Note that, if the sheet thicknesses of the sheet members overlaid differ, "t" is made the sheet thickness of the thinnest sheet member. To secure the strength, the excess metal height is preferably large. The excess buildup part is preferably formed so that the height "h" becomes 0.5 t or more. However, with a size of the excess buildup part of a height exceeding 3 t, the weld metal droops down and the welding deformation becomes remarkable.

[Backing Plate]

The backing plate is preferably made one where the contact part contacting the steel sheet back surface is made the circle equivalent diameter (W) or so or more from the targeted circle equivalent center of the back surface weld bead. It is not particularly limited so long as a shape enabling the position of contact with the steel sheet back surface to be made over 3 t from the circle equivalent center of the back surface weld bead assuming forming a diameter 3 t or more back surface bead. Below, the shape of the recess of the backing plate, the contact part of the backing plate, and the material of the backing plate will be successively explained for the backing plate able to be used in the arc spot welding of the present invention.

(1) Shape of Recess of Backing Plate

For the shape of the recess of the backing plate, a rectangular shape, arc shape, or any other shape in the vertical cross-sectional view of the backing plate can be employed.

Figure 7A:
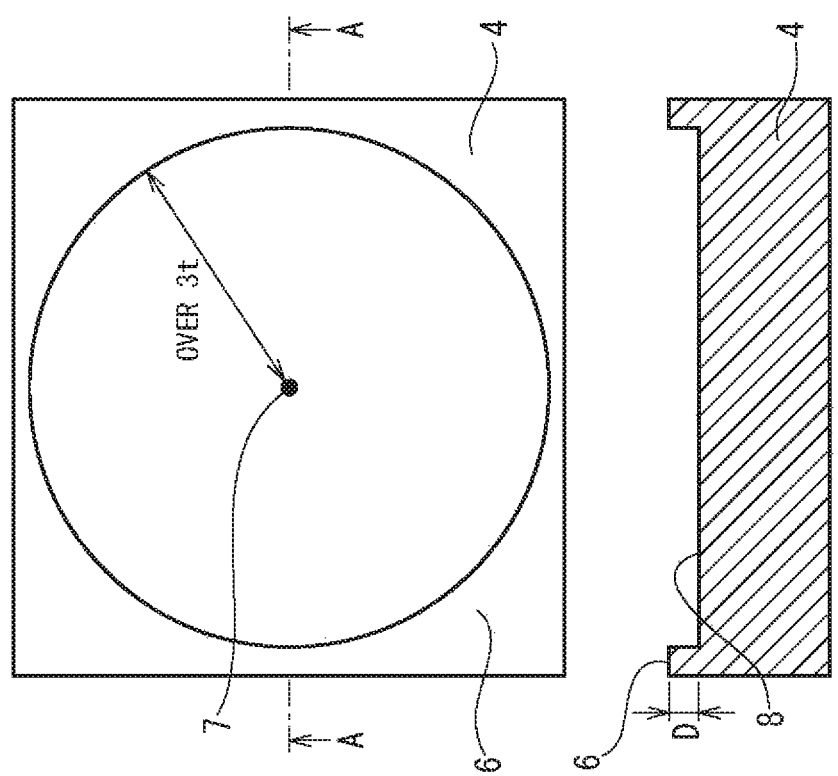
Figure 7B:
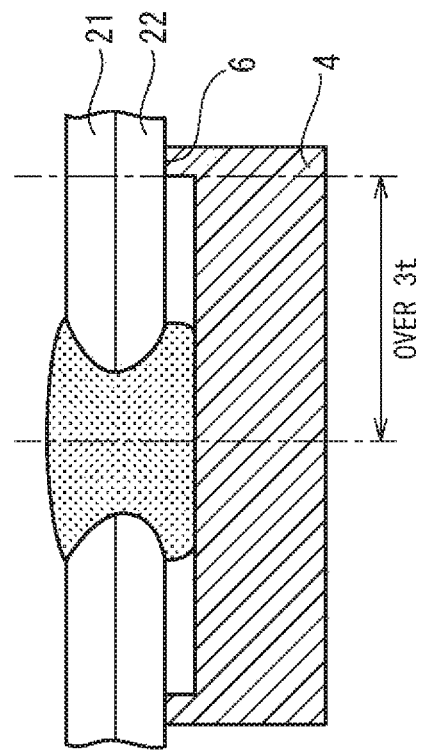

FIGS. 7A and 7B are views showing one example of the backing plate with a box-shaped recess when seen from the vertical cross-section. The upper figure in FIG. 7A is a plan view of a backing plate, while the lower figure is a vertical cross-sectional view along A-A. Further, FIG. 7B shows a cross-sectional view after arc spot welding using the backing plate of FIG. 7A. However, FIG. 7B is the same view as FIG. 5. This backing plate 4, as shown in the vertical cross-sectional view of FIG. 7A, has a recess shape made a rectangular shape. Further, it is made a shape where the contact part 6 of the backing plate 4 and the steel sheet back surface contact at a position over 3 t separated from the circle equivalent center 7 of the back surface weld bead. For this reason, as shown in the explanation of FIG. 5, in arc spot welding using this backing plate, the targeted weld zone shape could be obtained.

FIGS. 8A and 8B are views showing one example of a backing plate with a semispherical recess. The upper figure in FIG. 8A is a plan view of a backing plate and the lower figure is a vertical cross-sectional view along A-A. Further, FIG. 8B is a cross-sectional view after arc spot welding using the backing plate of FIG. 8A. This backing plate 4, as shown in the vertical cross-sectional view of FIG. 8A, has an arc shaped recess shape. Further, if making the radius of the recess of this backing plate 4 3 t or so or more and making the recess depth D 0.2 t or so in size for arc spot welding, the targeted back surface weld zone shape having a back surface weld bead diameter of 3 t or more or so and an excess metal height of 0.2 t or so was obtained. Furthermore, as shown in FIG. 8B, a back surface weld bead shape with small rising angles of the toe parts was obtained.

In this way, comparing back surface weld beads obtained using backing plates 4 with a rectangular shape and arc shape recess in the vertical cross-section, a back surface weld bead obtained using a backing plate 4 with an arc shaped recess becomes smaller in rising angles of the toe parts. Further, if the rising angles of the toe parts of the back surface weld bead are small, the fatigue strength is improved, so the recess of the backing plate 4 is preferably made an arc shape.

Further, the backing plate 4 is preferably made a backing plate shape in the vertical cross-sectional view where the distance D in the height direction between at least the non-contact part 8 facing the circle equivalent center 7 of the back surface weld bead and not contacting the steel sheet back surface of the backing plate 4 and the contact part 6 becomes 0.2 t to 3 t. The excess metal height and the distance D become generally equal values, so by making the distance D 0.2 t to 3 t, it is possible to make the excess metal height the targeted 0.2 t to 3 t.

(2) Contact Part of Backing Plate

For the contact between the contact part of the backing plate and the steel sheet back surface, at least one of point contact, line contact, and planar contact can be employed.

Figure 9B:
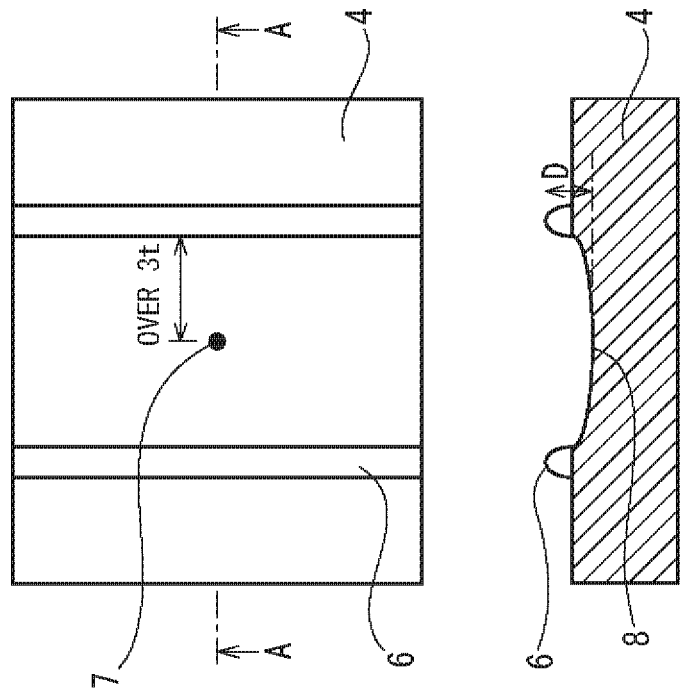
Figure 9A:
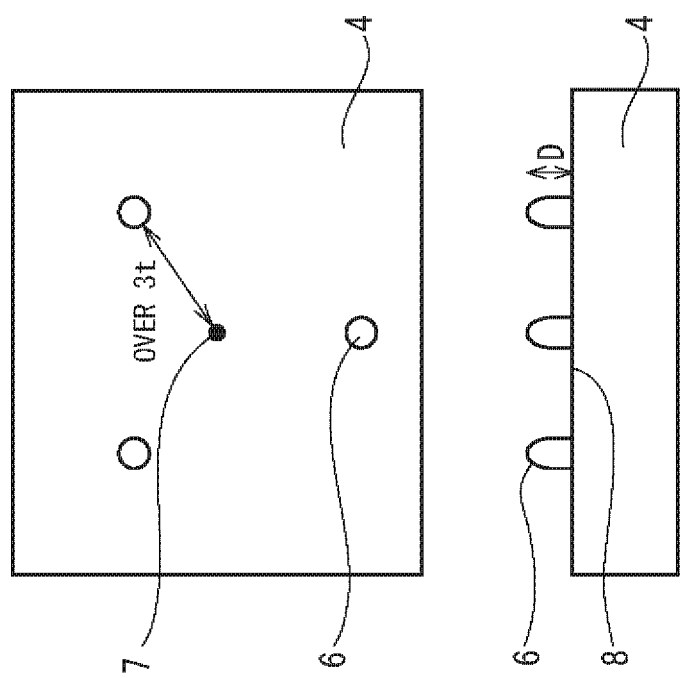

FIGS. 9A and 9B are views showing examples of the backing plate. The upper figure on FIG. 9A is a plan view of a backing plate having a contact part contacting the steel sheet back surface by point contact, while the lower figure is a side view of that backing plate.

Further, FIG. 9B is a plan view of a backing plate having a contact part contacting the steel sheet back surface by line contact. The lower figure is a vertical cross-sectional view along A-A of that backing plate.

As shown in FIG. 9A, if making the contact between the backing plate 4 and the steel sheet back surface point contact, the contact area becomes smaller and the heat removal by the backing plate near the melted region is decreased, so it is possible to easily enlarge the diameter of the back surface weld bead to the target diameter. In this figure, the top of a semispherical part of the front end of a column was made the contact part 6, but the contact part 6 may be made the top of a conical part or any other part can be employed so long as having a strength enabling utilization as the backing plate 4. Further, in the plan view, the contact part included three points, but it may also include four or more points.

As shown in FIG. 9B. if making the contact of the backing plate 4 and the steel sheet back surface line contact, the contact area becomes larger than point contact, but the heat removal by the backing plate near the melted region sufficiently decreases, so the diameter of the back surface weld bead can be enlarged to the target diameter. On the other hand, from the viewpoint of the strength of the contact part 6, line contact is preferable. In this figure, in the vertical cross-sectional view, the top of the arc shaped part of the front end of a box shape was made the contact part 6, but the contact part 6 may be made the top of a triangular shape or any other part can be employed so long as having a strength enabling utilization as a backing plate. Further, in the plan view, the contact part 6 included two straight line shapes, but it may also include three or more or may include bent lines or curved lines.

Figure 10A:
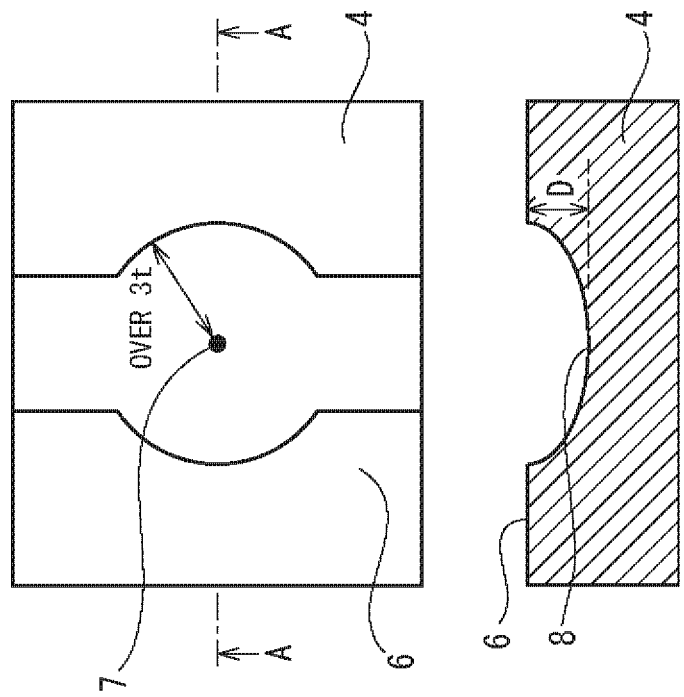
Figure 10B:
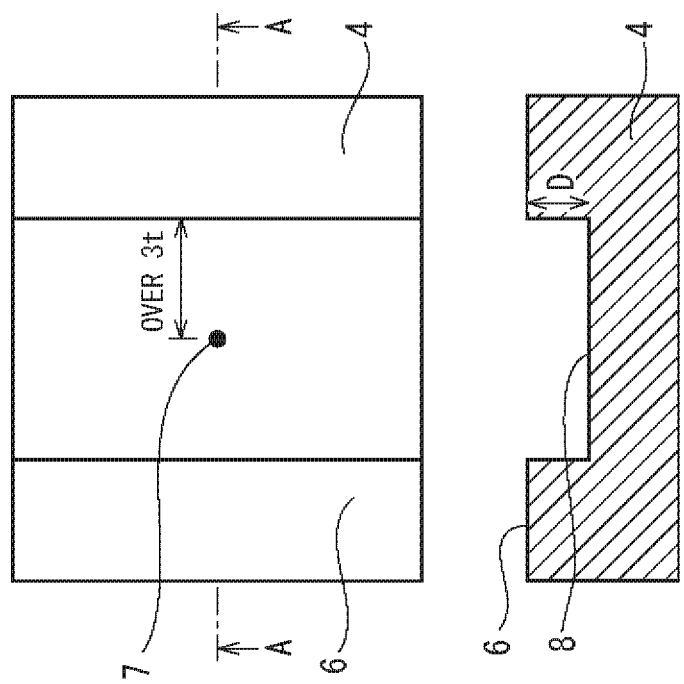

FIGS. 10A and 10B are views showing one example of a backing plate having a contact part contacting the steel sheet back surface by planar contact. The top figure of FIG. 10A is a plan view of a backing plate having a contact part with a rectangular contact surface, while the bottom figure is a vertical cross-sectional view along A-A of that backing plate. Further, FIG. 10B is a plan view of a backing plate having a contact part of a rectangular contact surface having a recess. The bottom figure is a vertical cross-sectional view along A-A of that backing plate.

The backing plates 4 shown in FIGS. 7A and 7B, FIGS. 8A and 8B, and FIGS. 10A and 10B all feature planar contact as the contact between the backing plate 4 and steel sheet back surface, but the backing plates 4 shown in FIGS. 7A and 7B and FIGS. 8A and 8B have contact surfaces connected on the same plane, while the backing plate of FIGS. 10A and 10B has contact surfaces separated on the same plane. By doing this, compared with the backing plates 4 of FIGS. 7A and 7B and FIGS. 8A and 8B, the contact area of the backing plate 4 shown in FIGS. 10A and 10B becomes smaller and heat removal by the backing plate 4 near the melted region decreases, so the diameter of the back surface weld bead can be enlarged to the target diameter. In this figure, the two rectangular contact surfaces in the plan view were made the contact part 6, but the contact part 6 may also include three surfaces or more or may be circular or triangular or any other shape.

Note that the invention is not limited to the embodiments shown in FIGS. 7A and 7B to FIGS. 10A and 10B. It is possible to combine various shapes of recesses of the backing plate 4 and forms of the contact parts 6 and possible to combine point contact, line contact, and planar contact in a single backing plate 4.

(3) Material of Backing Plate

The backing plate 4 can be formed from copper or a copper alloy or steel or ceramic. Further, it is possible to arrange ceramic with a low heat conduction at the contact part of the copper or copper alloy backing plate and steel sheet and employ another combination. However, from the viewpoint of workability, copper or a copper alloy is preferable.

Figure 21:
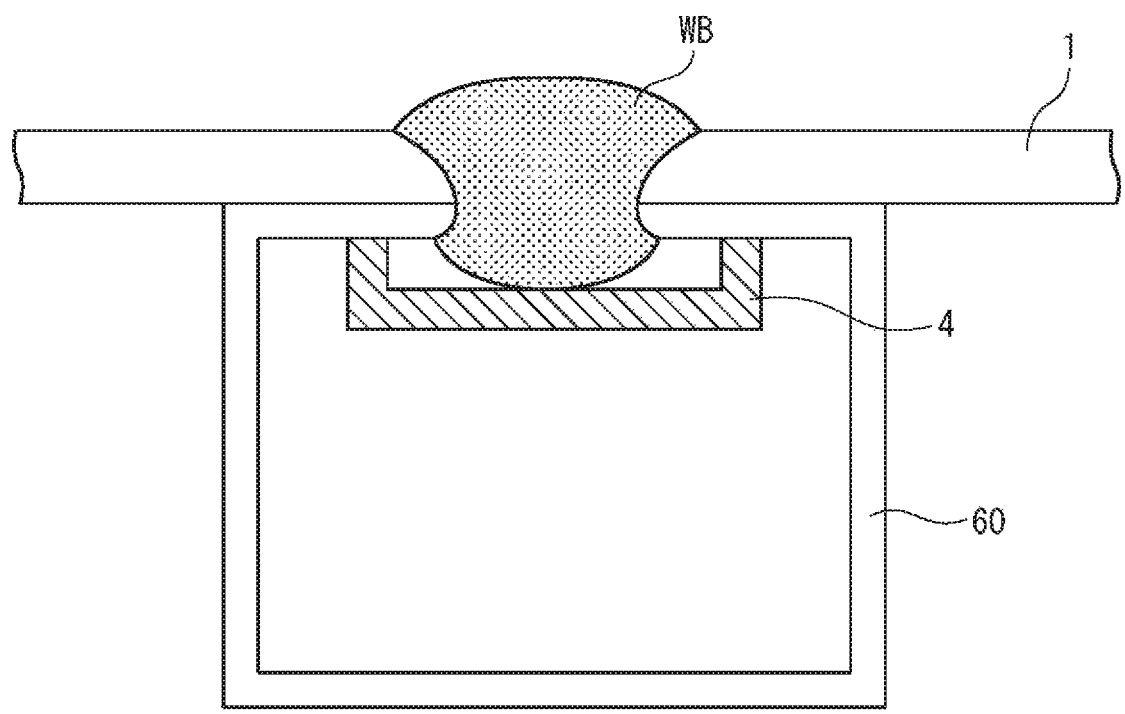
FIG. 21 is an enlarged cross-sectional view of a welded part of one example of the arc spot welding method fastening a backing plate in a steel tube.

Further, when not removing the backing plate after arc spot welding and using the steel sheet, weld bead, and backing plate as an integral structure, the backing plate may also be made using steel. For example, as shown in FIG. 21, when fastening the backing plate 4 inside a steel tube 60 in advance and then arc welding, it is preferable to make the backing plate 4 steel. Note that even if making the material of the backing plate steel, it is necessary to define the shape of the recess and the contact part of the backing plate to enlarge the shape of the weld bead at the back surface side of the steel sheet, as explained above.

Further, when welding so that the circle equivalent diameter (bead diameter) W of the back surface weld bead becomes over 5 t to 10 t, the backing plate 4 is preferably made of copper, a copper alloy, or steel and the contact between the contact part 6 of the backing plate 4 and the steel sheet back surface is made planar contact. If the circle equivalent diameter W of the back surface weld bead is increased, the distance between parts of the contact part 6 of the backing plate 4 becomes greater, so the strength of the contact part 6 of the backing plate 4 falls. For this reason, the backing plate 4 is preferably made of copper, a copper alloy, or steel and the contact between the contact part 6 of the backing plate 4 and the steel sheet back surface is preferably made planar contact.

[Contact Area of Contact Part of Backing Plate and Steel Sheet Back Surface]

The contact area between the contact part 6 of the backing plate 4 and the steel sheet back surface is preferably made 10 $cm^2$ or less. To keep down the heat removal by the backing plate 4 near the melted region and enable the targeted back surface weld bead shape to be easily obtained, it is preferable to make the contact area smaller. Making it 5 $cm^2$ or less is more preferable.

[Conditions of Arc Generation and Short-Circuit Conduction]

As explained above, in the present invention, to make the short-circuiting time where the welding voltage becomes 10V or less over 30% to less than 60% per conduction cycle, it is necessary to alternately continuously repeat arc generation and short-circuit conduction without suspension. The time period for continuous repetition of the arc generation and short-circuit conduction, that is, one arc spot welding time period, is preferably set to 1 second to 3 seconds.

The arc spot welding method of the present invention may be worked while reflecting or feeding back the weld state. For this reason, the arc generation time periods in the different cycles in one arc spot welding time period may be the same or different. The short-circuiting time periods of the different cycles in one arc spot welding time period may also be the same or different. However, the arc generation time period and short-circuiting time period in the different cycles are preferably set so that the periods become 5 msec to 20 msec.

Next, an arc spot welding apparatus of the present invention will be explained in detail with reference to the drawings.

Figure 11:
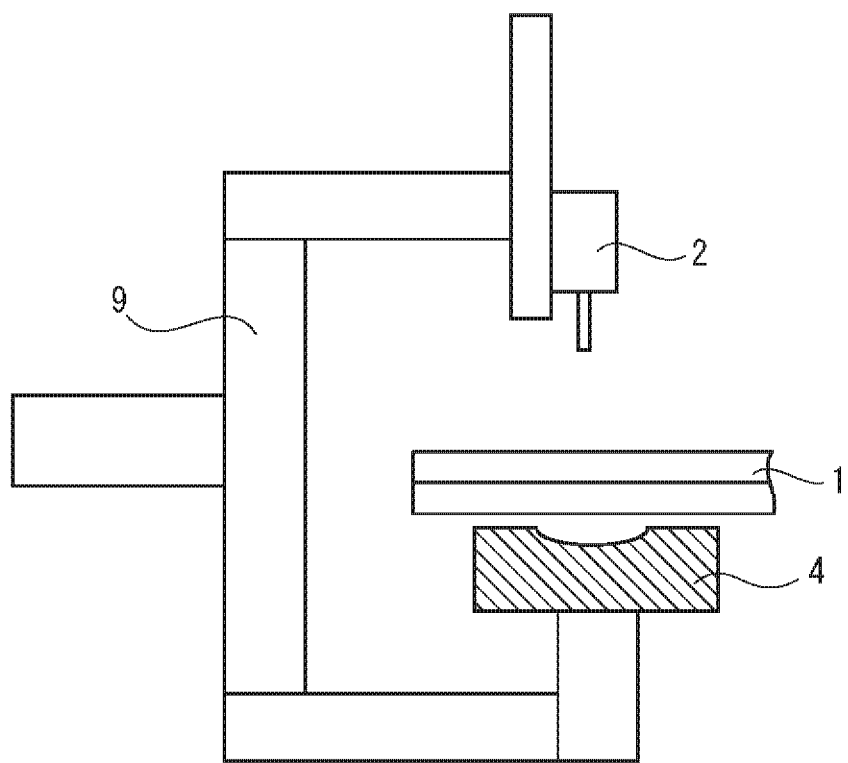
FIG. 11 is a view showing one example of an arc spot welding apparatus.

FIG. 11 is a view showing one example of an arc spot welding apparatus. An automobile member in almost all cases is welded using a welding robot. For this reason, it is preferable to use an apparatus provided with an integral backing plate 4 and welding torch 2 to perform efficient welding work. As shown in FIG. 11, a pair of a backing plate 4 and welding torch 2 are set at the tip of a multiarticulated robot. The relative positions of the robot arm 9 and backing plate 4 are fixed. Due to the operation of the robot arm 9, the backing plate 4 is arranged at a predetermined position on the steel sheet back surface. After that, the welding torch 2 descends to a predetermined position to perform the welding.

Figure 12:
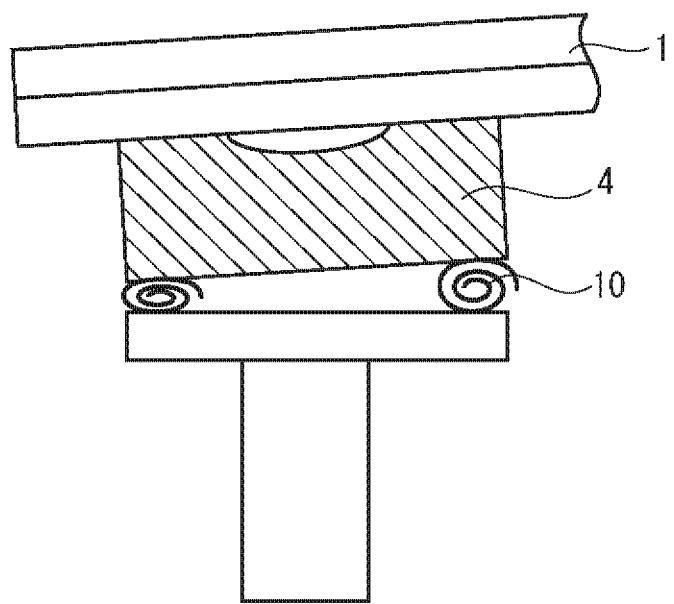
FIG. 12 is a view showing one example of an adjusting means for mounting angle of the backing plate.

When welding an actual part, due to poor precision of the members, sometimes a gap will be formed between the steel sheet back surface and backing plate. FIG. 12 is a view showing one example of an adjusting means for mounting angle of a backing plate. In this way, it is possible to adjust the mounting angle of the backing plate 4 with respect to the steel sheet back surface through a spring 10. The adjusting means for mounting angle is not limited to a spring 10. Any means may be employed so long as one able to adjust the mounting angle such as able to turn the carrying table.

Figure 13:
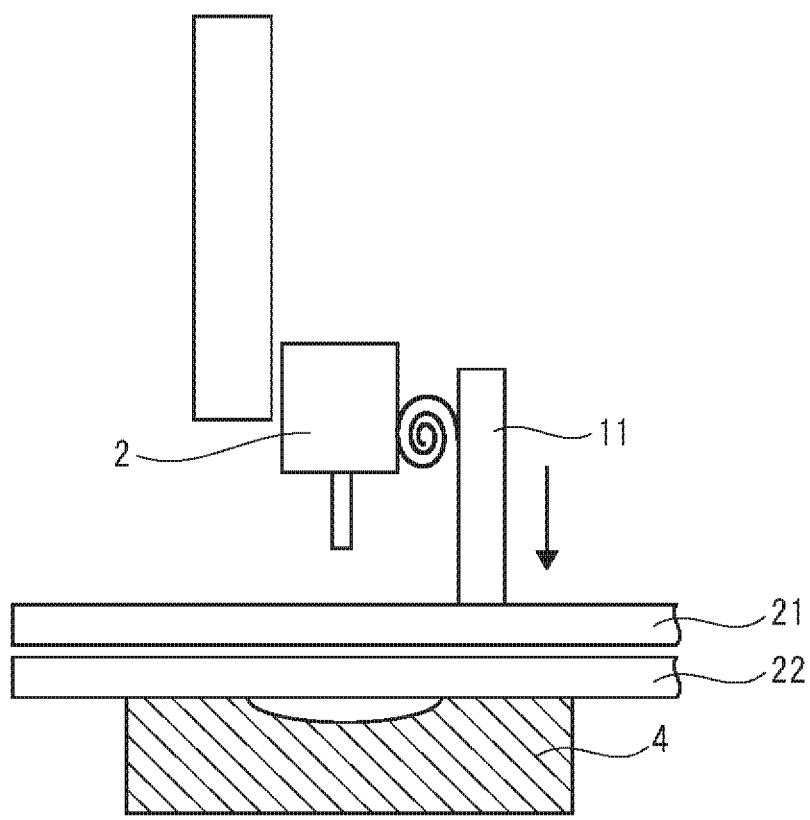
FIG. 13 is a view showing one example of a pressing means of an upper side steel sheet.

FIG. 13 is a view showing one example of a pressing means of the upper side steel sheet. In this way, means can be provided for pressing the upper side steel sheet 21 along with the descent of the welding torch 2 to grip the upper side steel sheet 21 and the lower side steel sheet 22 with the backing plate and thereby eliminate the clearance between the upper side steel sheet 21 and the lower side steel sheet 22. The pressing means 11 of the upper side steel sheet 21 is not limited to a device provided at the welding torch 2. A device provided at the robot arm 9 able to move in the pressing direction or any other means can be employed so long as able to press the upper side steel sheet 21.

EXAMPLES

Next, examples of the present invention will be explained, but the conditions in the examples are illustrations of conditions employed for confirming the workability and effect of the present invention. The present invention is not limited to these illustrations of conditions. The present invention can employ various conditions so long as not departing from the gist of the present invention and achieving the object of the present invention. Table 1 shows the sheet thickness, tensile strength, and chemical composition of the high strength steel sheets used.

Test use steel sheets were cut out from the steel sheet shown in Table 1. A copper backing plate was arranged at the test-use steel sheet back surface, then the steel sheets were arc spot welded under conditions of the weld input heat shown in Table 2-1 and the welding current, welding voltage, welding time, arc generation, and short-circuit conduction shown in Table 2-2 to prepare the test pieces of Test Nos. 1 to 22. Further, as the shield gas, a mixed gas of 20 vol % $CO_2$ gas and a balance of Ar gas was used. Test Nos. 1 to 3 are test pieces prepared without using backing plates, Test Nos. 4 to 17 are test pieces prepared using copper backing plates, and Test Nos. 18 to 22 are test pieces prepared using steel backing plates. Further, in the production of each of Test Nos. 1 to 22 as well, the arc generation time period and short-circuiting time period of each cycle of the arc spot welding time period were set to become 5 msec to 20 msec.

In Table 2-1, the "backing plate recess radius" column shows the distance from the circle equivalent center of the back surface weld bead to the contact part of the backing plate contacting the back surface of the lower side steel sheet, while the "backing plate recess depth 'd'" column shows the distance in the height direction between the non-contact part of the backing plate facing the circle equivalent center of back surface weld bead and the contact part of the backing plate (that is, the clearance between the lower side steel sheet and non-contact part of the backing plate). Further, in Table 2-1, in the "form of contact between steel sheet back surface and backing plate" column, "Planar contact" means, as shown in FIG. 7, when using a backing plate having a recess surrounded by a closed curve and having a shape contacting the steel sheet back surface by planar contact along the outer circumference of the recess. "3-point contact" means, as shown in FIG. 9A, when using a backing plate of a structure securing a clearance of the "backing plate recess depth 'd'" with the steel sheet back surface by three-point support by top parts of columns of the contact part 6 provided at three locations on the surface. Further, the description "2-line contact" means, as shown in FIG. 9B, using a backing plate of a structure securing a clearance of the "backing plate recess depth 'd'" with the steel sheet back surface by support by the top parts of the contact part 6 on walls provided on the surface separated by a certain interval in parallel to each other.

TABLE 1

| Steel sheet no. | Sheet thickness "t" (mm) | Strength (MPa) | Chemical composition (mass %) | | | | | | | | | | | |
|---|---|---|---|---|---|---|---|---|---|---|---|---|---|---|
| | | | C | Si | Mn | P | S | Al | N | Cr | V | B | Mg |
| A | 1.6 | 2250 | 0.43 | 0.22 | 1.0 | 0.013 | 0.005 | 0.035 | 0.006 | — | — | — | — |
| B | 1.0 | 1890 | 0.33 | 0.3 | 2.5 | 0.015 | 0.002 | 0.030 | 0.0043 | 0.3 | 0.05 | 0.0015 | 0.003 |

TABLE 2-1

| Test no. | 1st steel sheet | 2nd steel sheet | Thin side sheet thickness "t" (mm) | Weld heat input (J) | Backing plate recess radius R (mm) | R/t (over 3) | Backing plate recess depth "d" (mm) | d/t (0.2 to 3) | Form of contact between steel sheet back surface and backing plate | Contact area between steel sheet back surface and backing plate ($cm^2$) | Presence of through hole | Diameter of through hole (mm) | Remarks |
|---|---|---|---|---|---|---|---|---|---|---|---|---|---|
| 1 | A | A | 1.6 | 5800 | — | — | — | — | — | — | None | — | No backing plate |
| 2 | A | A | 1.6 | 10420 | — | — | — | — | — | — | None | — | No backing plate |
| 3 | A | A | 1.6 | 5950 | — | — | — | — | — | — | Yes | 5 | No backing plate |
| 4 | A | A | 1.6 | 10550 | 0.0 | 0.0 | 0.0 | 0.0 | Planar contact | Full planar contact | None | — | Copper backing plate |

TABLE 2-1-continued

| Test no. | 1st steel sheet | 2nd steel sheet | Thin side sheet thickness "t" (mm) | Weld heat input (J) | Backing plate recess radius R (mm) | R/t (over 3) | Backing plate recess depth "d" (mm) | d/t (0.2 to 3) | Form of contact between steel sheet back surface and backing plate | Contact area between steel sheet back surface and backing plate (cm²) | Presence of through hole | Diameter of through hole (mm) | Remarks |
|---|---|---|---|---|---|---|---|---|---|---|---|---|---|
| 5 | A | A | 1.6 | 10510 | 2.5 | 1.6 | 1.0 | 0.6 | Planar contact | 9.8 | None | — | Copper backing plate |
| 6 | A | A | 1.6 | 10480 | 6.0 | 3.8 | 0.5 | 0.3 | Planar contact | 9.5 | None | — | Copper backing plate |
| 7 | A | A | 1.6 | 10480 | 8.0 | 5.0 | 1.0 | 0.6 | 3-point contact | 0.2 | None | — | Copper backing plate |
| 8 | A | A | 1.6 | 13330 | 8.0 | 5.0 | 2.0 | 1.3 | 3-point contact | 0.2 | None | — | Copper backing plate |
| 9 | A | A | 1.6 | 13330 | 8.0 | 5.0 | 2.0 | 1.3 | 2-line contact | 1.8 | None | — | Copper backing plate |
| 10 | A | A | 1.6 | 6120 | 8.0 | 5.0 | 2.0 | 1.3 | 3-point contact | 0.2 | Yes | 5 | Copper backing plate |
| 11 | A | A | 1.6 | 10480 | 12.0 | 7.5 | 2.0 | 1.3 | Planar contact | 8.9 | None | — | Copper backing plate |
| 12 | A | A | 1.6 | 10380 | 8.0 | 5.0 | 0.7 | 0.4 | Planar contact | 12.1 | None | — | Copper backing plate |
| 13 | A | B | 1.0 | 10210 | 8.0 | 8.0 | 3.0 | 3.0 | 3-point contact | 0.2 | None | — | Copper backing plate |
| 14 | B | B | 1.0 | 5800 | 8.0 | 8.0 | 1.0 | 1.0 | 3-point contact | 0.2 | Yes | 5 | Copper backing plate |
| 15 | A | A | 1.6 | 10480 | 8.0 | 5.0 | 1.0 | 0.6 | Planar contact | 9.5 | None | — | Copper backing plate |
| 16 | A | A | 1.6 | 10380 | 8.0 | 5.0 | 1.0 | 0.6 | Planar contact | 9.5 | None | — | Copper backing plate |
| 17 | A | A | 1.6 | 10480 | 12.0 | 7.5 | 2.0 | 1.3 | Planar contact | 8.9 | None | — | Copper backing plate |
| 18 | A | A | 1.6 | 10340 | 0.0 | 0.0 | 0.0 | 0.0 | Planar contact | Full planar contact | None | — | Steel backing plate |
| 19 | A | A | 1.6 | 10340 | 2.5 | 1.6 | 1.0 | 0.6 | Planar contact | 9.8 | None | — | Steel backing plate |
| 20 | A | A | 1.6 | 10480 | 8.0 | 5.0 | 2.0 | 0.6 | Planar contact | 9.5 | None | — | Steel backing plate |
| 21 | A | A | 1.6 | 10480 | 8.0 | 5.0 | 3.0 | 1.3 | 3-point contact | 0.2 | None | — | Steel backing plate |
| 22 | A | A | 1.6 | 10340 | 8.0 | 5.0 | 1.0 | 0.6 | Planar contact | 9.5 | None | — | Steel backing plate |

TABLE 2-2

| Test No. | Welding current (A) | Welding voltage (V) | Welding time (s) | Welding voltage/welding current | Short-circuit time ratio (%) |
|---|---|---|---|---|---|
| 1 | 198 | 16.3 | 1.8 | 0.082 | 41 |
| 2 | 233 | 17.9 | 2.5 | 0.077 | 56 |
| 3 | 202 | 16.4 | 1.8 | 0.081 | 43 |
| 4 | 233 | 18.1 | 2.5 | 0.078 | 56 |
| 5 | 238 | 17.7 | 2.5 | 0.074 | 57 |
| 6 | 228 | 18.4 | 2.5 | 0.081 | 43 |
| 7 | 230 | 18.2 | 2.5 | 0.079 | 44 |
| 8 | 230 | 20.7 | 2.8 | 0.090 | 36 |
| 9 | 233 | 22.9 | 2.5 | 0.098 | 33 |
| 10 | 205 | 16.6 | 1.8 | 0.081 | 44 |
| 11 | 231 | 18.1 | 2.5 | 0.079 | 40 |
| 12 | 230 | 18.1 | 2.5 | 0.078 | 42 |
| 13 | 233 | 17.5 | 2.5 | 0.075 | 50 |
| 14 | 205 | 15.7 | 1.8 | 0.077 | 46 |
| 15 | 235 | 22.3 | 2 | 0.095 | 16 |
| 16 | 229 | 26.7 | 1.7 | 0.116 | 5 |
| 17 | 229 | 15.3 | 3 | 0.067 | 68 |
| 18 | 233 | 17.8 | 2.5 | 0.076 | 55 |
| 19 | 229 | 18.1 | 2.5 | 0.079 | 48 |
| 20 | 231 | 18.1 | 2.5 | 0.079 | 45 |
| 21 | 234 | 17.9 | 2.5 | 0.077 | 48 |
| 22 | 228 | 22.7 | 2 | 0.099 | 11 |

Each of the above test pieces was first visually checked for the shape of the weld bead and measured for back surface weld bead diameter "W" and excess metal height "h".

In the case of using a copper backing plate, the back surface weld bead diameter W was found by measuring the circle equivalent diameter in a plan view, while the excess metal height "h" was found by cutting the weld zone in the direction in which the bead diameter became generally the largest in a plan view, taking a photograph of that cross-section, then using an image analysis apparatus and making the maximum height of the cross-section the excess metal height. On the other hand, in the case of using a steel backing plate, the backing plate melts with the steel sheet, so the backing plate and weld bead are integrally formed. Therefore, the cross-sectional image of the weld zone was used to find the maximum value of the weld bead width at the steel sheet back surface, that maximum value was defined as the back surface weld bead diameter W, and the maximum melted depth was defined as the excess metal height "h". Table 3 shows the back surface weld bead diameter W and the excess metal height "h".

Figure 14:
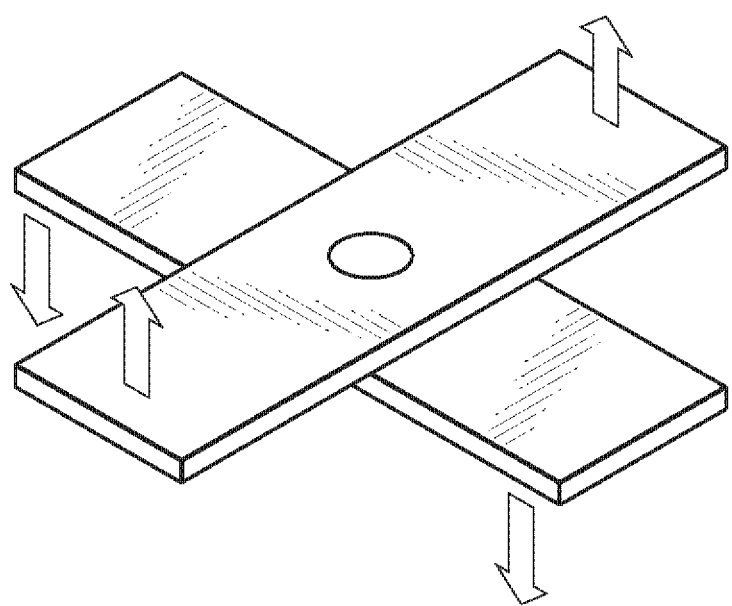
FIG. 14 is a view showing a test piece for a cross tensile test.

The test piece for the cross tensile test was prepared, based on the cross tensile test method for spot welded joints (JIS Z3137), by overlaying steel sheets in a cross shape such as shown in FIG. 14, arranging the backing plate at the back surface, and lap welding the test piece according to the arc spot welding method to prepare a cross tensile test piece. At this time, as the welding wire, YGW17 described in JIS Z3312 was used.

Figure 15:
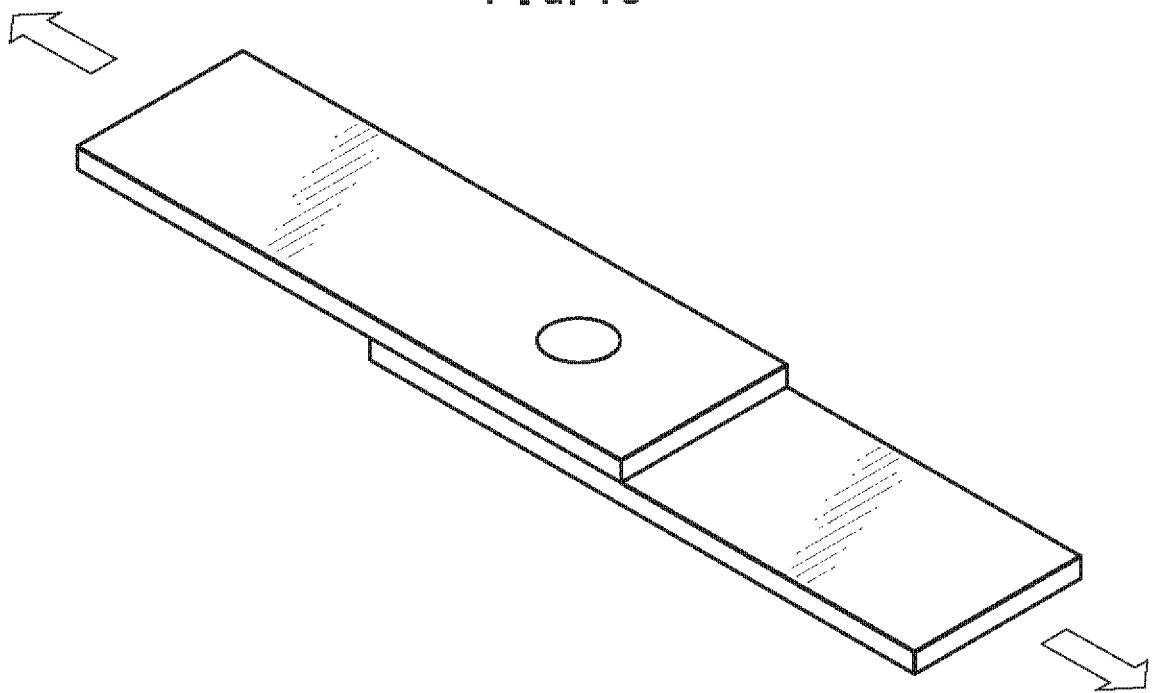
FIG. 15 is a view showing a test piece for a tensile shear test.
Figure 16:
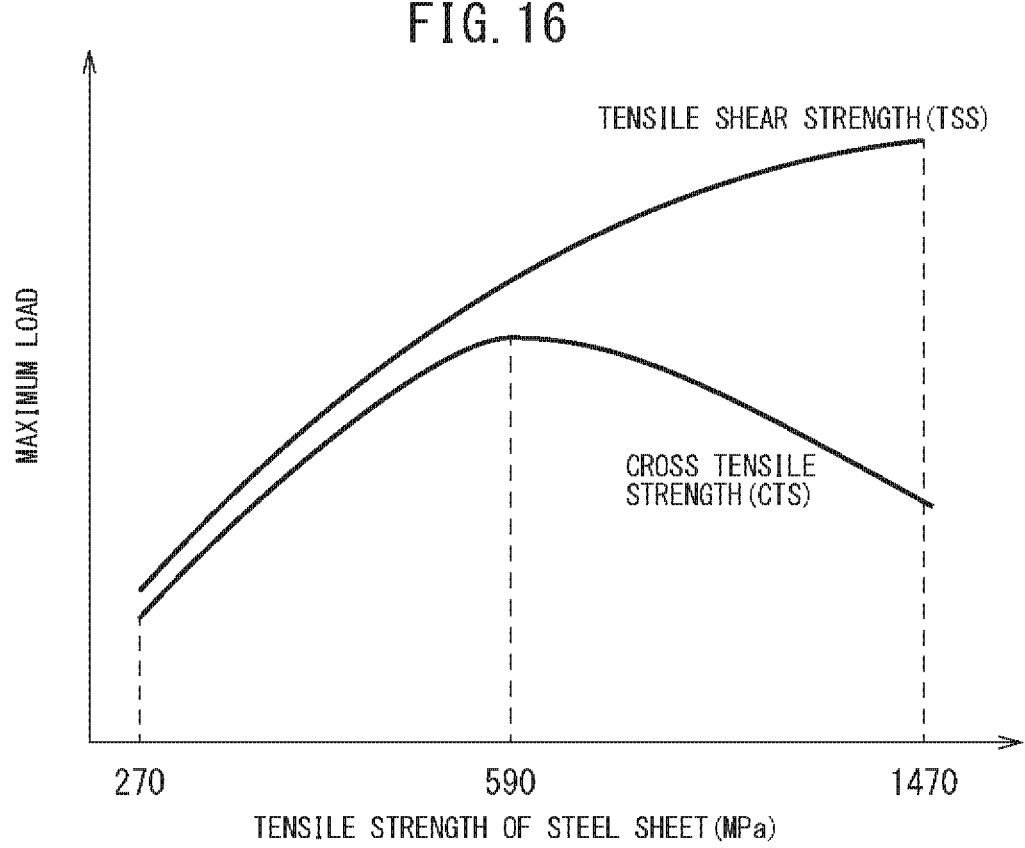
FIG. 16 is a view showing the relationships of the tensile shear strength (TSS) and cross tensile strength (CTS) with the tensile strength of the steel sheets.

Further, the test piece for the tensile shear test was similarly prepared, based on the tensile shear test method of spot welded joints (JIS Z3136), by overlaying test pieces in parallel as shown in FIG. 15, arranging the backing plate at the back surface, and welding together the test pieces according to the arc spot welding method to prepare a tensile shear test piece.

Further, a cross tensile test piece was tested by a cross tensile test based on JIS Z3137 to measure the cross tensile strength (CTS (unit: kN)). Further, a tensile shear test piece was tested by a tensile shear test based on JIS Z3136 to measure the tensile shear strength (TSS (unit: kN)). Table 3 shows the cross tensile strength and tensile shear strength.

In the results shown in Table 3, Test Nos. 1 to 5, 15 to 19, and 22 are comparative examples, while Test Nos. 6 to 14, 20, and 21 are invention examples.

The test pieces of Test Nos. 6 to 14 are invention examples fabricated using copper backing plates with a recess radius larger than 3 t. According to these invention examples, the contact parts of the backing plates contact the steel sheet back surfaces at positions of over 3 t from the target circle equivalent center of the back surface weld bead, so it could be confirmed that the targeted back surface weld bead diameter and excess metal height could be obtained and a welded joint excellent in both cross tensile strength and tensile shear strength was obtained. Further, the test pieces of Test Nos. 20 and 21 were prepared using steel backing plates of shapes prescribed in the present invention, so good cross tensile strengths and tensile shear strengths could be obtained.

On the other hand, the test piece of Test No. 1 was not formed with the back surface weld bead. The test pieces of Test Nos. 2 and 3 suffered from melt off of the weld metal. The test pieces of Test Nos. 4 and 5 were prepared using backing plates with recess radii smaller than 3 t. In this way, the test pieces of Test Nos. 4 and 5 were prepared under conditions where the positions of contact of the steel sheet back surface and the contact part of the backing plate did not satisfy the range prescribed by the present invention, so the targeted back surface weld bead diameter and excess metal height could not be obtained and a welded joint having a sufficient cross tensile strength and tensile shear strength could not be obtained.

Further, the test pieces of Test Nos. 18 and 19 using steel backing plates were fabricated using backing plates with recess radii smaller than 3 t. Since the test pieces of Test Nos. 18 and 19 were fabricated under conditions where the contact position of the steel sheet back surface and contact part of the backing plate did not satisfy the range prescribed in the present invention in this way, the back surface weld bead diameter was small and the targeted strength of joint could not be obtained. Note that the strength of joint was judged by the tensile shear strength TSS. A value of 2 times or more of Class A of the tensile shear strength (steel) of spot welding prescribed in JIS Z 3140, that is, with steel sheet of a sheet thickness of 1.6 mm, 20 kN or more and, with steel sheet of a sheet thickness of 1 mm, 10 kN or more, was considered "passing".

The test pieces of Test Nos. 15 to 17 and 22 show the results of the cases where the short-circuit time rate or ratio of welding current and welding voltage under the welding conditions do not satisfy the prescribed ranges of the present invention. The test pieces of Test Nos. 15, 16, and 22 were small in short-circuit time ratio, so simultaneous with the start of welding, the weld metal ended up melting off to the backing plate. The back surface weld bead and the steel sheet back surface were insufficiently melted together, so a sufficient effect of improvement of the bonding strength could not be obtained. Test Nos. 19 was large in short-circuit time ratio, so stable welding was not possible, the steel sheet back surface was not yet melted, and a sufficient effect of improvement of the bonding strength could not be obtained.

TABLE 3

| Test no. | Thin side sheet thickness "t" (mm) | Back surface weld bead diameter W (mm) | W/t (3 to 10) | Excess buildup height "h" (mm) | h/t (0.2 to 3) | CTS (kN) | TSS (kN) | Fused state | Remarks |
| --- | --- | --- | --- | --- | --- | --- | --- | --- | --- |
| 1 | 1.6 | 0.0 | 0.0 | 0.0 | 0.0 | 3.3 | 17 | Back surface of lower side steel sheet not melted | Comp. ex. |
| 2 | 1.6 | 4.5 | 2.8 | 8.7 | 5.4 | 4.1 | 18 | Melting and dropping of weld metal | Comp. ex. |
| 3 | 1.6 | 6.4 | 4.0 | 9.2 | 5.8 | 5.4 | 18 | Melting and dropping of weld metal | Comp. ex. |
| 4 | 1.6 | 0.0 | 0.0 | 0.0 | 0.0 | 3.7 | 17 | Back surface of lower side steel sheet not melted | Comp. ex. |
| 5 | 1.6 | 3.4 | 2.1 | 0.8 | 0.5 | 6.3 | 18 | Back surface of lower side steel sheet insufficiently melted | Comp. ex. |
| 6 | 1.6 | 5.5 | 3.4 | 0.4 | 0.3 | 8.2 | 21 | Good | Inv. ex. |
| 7 | 1.6 | 10.2 | 6.4 | 0.9 | 0.6 | 9.8 | 22 | Good | Inv. ex. |
| 8 | 1.6 | 12.1 | 7.6 | 1.9 | 1.2 | 10.2 | 23 | Good | Inv. ex. |
| 9 | 1.6 | 10.8 | 6.8 | 1.9 | 1.2 | 10.2 | 22 | Good | Inv. ex. |
| 10 | 1.6 | 12.1 | 7.6 | 1.9 | 1.2 | 10.6 | 23 | Good | Inv. ex. |
| 11 | 1.6 | 9.9 | 6.2 | 1.9 | 1.2 | 10.1 | 22 | Good | Inv. ex. |
| 12 | 1.6 | 5.6 | 3.5 | 0.6 | 0.4 | 8.1 | 21 | Good | Inv. ex. |
| 13 | 1.0 | 9.8 | 9.8 | 2.8 | 2.8 | 4.5 | 13 | Good | Inv. ex. |

TABLE 3-continued

| Test no. | Thin side sheet thickness "t" (mm) | Back surface weld bead diameter W (mm) | W/t (3 to 10) | Excess buildup height "h" (mm) | h/t (0.2 to 3) | CTS (kN) | TSS (kN) | Fused state | Remarks |
|---|---|---|---|---|---|---|---|---|---|
| 14 | 1.0 | 6.8 | 6.8 | 0.9 | 0.9 | 4.3 | 10 | Good | Inv. ex. |
| 15 | 1.6 | 3.4 | 2.1 | 0.9 | 0.6 | 3.7 | 18 | Poor fusion | Comp. ex. |
| 16 | 1.6 | 8.1 | 5.1 | 1.9 | 1.2 | 6.3 | 18 | Poor fusion | Comp. ex. |
| 17 | 1.6 | 0.0 | 0.0 | 0.0 | 0.0 | 3.7 | 18 | Back surface of lower side steel sheet not melted | Comp. ex. |
| 18 | 1.6 | 0.0 | 0.0 | 0.0 | 0.0 | 4.2 | 19 | Back surface of lower side steel sheet not melted | Comp. ex. |
| 19 | 1.6 | 4.2 | 2.6 | 1.6 | 1.0 | 7.6 | 19 | Back surface of lower side steel sheet insufficiently melted | Comp. ex. |
| 20 | 1.6 | 9.1 | 5.7 | 2.4 | 1.5 | 9.3 | 22 | Good | Inv. ex. |
| 21 | 1.6 | 12.1 | 7.6 | 3.3 | 2.1 | 10.9 | 23 | Good | Inv. ex. |
| 22 | 1.6 | 4.1 | 2.6 | 1.6 | 1.0 | 4.8 | 19 | Poor fusion | Comp. ex. |

INDUSTRIAL APPLICABILITY

According to the present invention, even in welding of various chemical compositions of high strength steel sheets, an arc spot welded joint excellent in both TSS and CTS is obtained without reduction of the toughness or ductility of the weld zone, so by applying the present invention in the process of manufacture of auto parts or assembly of car bodies, members more excellent in strength can be produced and safety of automobiles etc. can be improved. Accordingly, the present invention is high in industrial applicability.

REFERENCE SIGNS LIST 1. steel sheet (weldable member)
21. upper side steel sheet
22. lower side steel sheet
2. welding torch
3. welding wire
4. backing plate
5. through hole
6. contact part
7. circle equivalent center of back surface weld bead
8. non-contact part
9. robot arm
10. spring
11. pressing means
30. poorly fused part
40. molten metal part contacting backing plate
50. lowest part of molten metal part
W. back surface weld bead diameter
h. excess metal height
D. distance between backing plate non-contact part and steel sheet back surface
WB. weld bead

The invention claimed is:

1. An arc spot welding method arranging a plurality of steel sheets containing carbon in amounts of 0.2 mass % or more overlaid and performing lap welding while arranging a backing plate in contact with a lower side steel sheet at an opposite side to a welding torch,
said backing plate comprising a non-contact part and a contact part, wherein the non-contact part faces said lower side steel sheet without contacting said lower side steel sheet and the contacting part contacts said lower side steel sheet,
said arc spot welding method comprising:
arranging the backing plate so that said contact part contacts the lower side steel sheet at a position exceeding 3 t from a circle equivalent center of a back surface weld bead and
alternately and continuously repeating arc generation and short-circuit conduction so that a short-circuiting time where a welding voltage becomes 10V or less becomes over 30% to less than 60% per conduction cycle,
where "t" is defined as the sheet thickness of the steel sheet with the thinnest sheet thickness among said plurality of steel sheets.

2. The arc spot welding method according to claim 1, wherein a value of a mean welding voltage (unit: V)/mean welding current (unit: A) in an arc spot welding time period in a time period of alternately and continuously repeating arc generation and short-circuit conduction is 0.07 to 0.10 (V/A) per cycle.

3. The arc spot welding method according to claim 2, wherein one cycle is made 5 msec to 20 msec and arc generation and short-circuit conduction are performed during that cycle.

4. The arc spot welding method according to claim 2, wherein said contact part maintains a clearance between a back surface of said lower side steel sheet and said non-contact part at 0.2 t to 3 t.

5. The arc spot welding method according to claim 2, forming a back surface weld bead having a weld bead diameter of a circle equivalent diameter of 3 t to 10 t and having an excess metal height of 0.2 t to 3 t.

6. The arc spot welding method according to claim 2, wherein the contact between said contact part and a back surface of said lower side steel sheet is at least one of point contact, line contact, and planar contact.

7. The arc spot welding method according to claim 1, wherein one cycle is made 5 msec to 20 msec and arc generation and short-circuit conduction are performed during that cycle.

8. The arc spot welding method according to claim 7, wherein said contact part maintains a clearance between a back surface of said lower side steel sheet and said non-contact part at 0.2 t to 3 t.

9. The arc spot welding method according to claim 7, forming a back surface weld bead having a weld bead diameter of a circle equivalent diameter of 3 t to 10 t and having an excess metal height of 0.2 t to 3 t.

10. The arc spot welding method according to claim 7, wherein the contact between said contact part and a back surface of said lower side steel sheet is at least one of point contact, line contact, and planar contact.

11. The arc spot welding method according to claim 1, wherein said contact part maintains a clearance between a back surface of said lower side steel sheet and said non-contact part at 0.2 t to 3 t.

12. The arc spot welding method according to claim 11, forming a back surface weld bead having a weld bead diameter of a circle equivalent diameter of 3 t to 10 t and having an excess metal height of 0.2 t to 3 t.

13. The arc spot welding method according to claim 11, wherein the contact between said contact part and a back surface of said lower side steel sheet is at least one of point contact, line contact, and planar contact.

14. The arc spot welding method according to claim 1, forming a back surface weld bead having a weld bead diameter of a circle equivalent diameter of 3 t to 10 t and having an excess metal height of 0.2 t to 3 t.

15. The arc spot welding method according to claim 1, wherein the contact between said contact part and a back surface of said lower side steel sheet is at least one of point contact, line contact, and planar contact.

16. The arc spot welding method according to claim 1, wherein when forming a back surface weld bead with a circle equivalent weld bead diameter of said back surface weld bead of over 5 t, said backing plate is formed by copper or a copper alloy and the contact between said contact part and a back surface of said lower side steel sheet is planar contact.

17. The arc spot welding method according to claim 1, wherein when forming a back surface weld bead with a circle equivalent weld bead diameter of said back surface weld bead of over 5 t, said backing plate is formed by a steel material and the contact between said contact part and a back surface of said lower side steel sheet is planar contact.

18. The arc spot welding method according to claim 1, wherein a contact area of said contact part and a back surface of said lower side steel sheet is 10 $cm^2$ or less.

19. An arc spot welding apparatus comprising;
  a backing plate provided with a non-contact part arranged separated from a back surface of said lower side steel sheet; and a contact part contacting the back surface of the lower side steel sheet maintaining a clearance of 0.2 t to 3 t between the back surface of said lower side steel sheet and said non-contact part, wherein
  the arc spot welding apparatus is configured to perform a method of
  arranging a plurality of steel sheets containing carbon in amounts of 0.2 mass % or more overlaid and performing lap welding while arranging the backing plate in contact with the lower side steel sheet at an opposite side to a welding torch,
  arranging the backing plate so that said contact part contacts the lower side steel sheet at a position exceeding 3 t from a circle equivalent center of a back surface weld bead and
  alternately and continuously repeating arc generation and short-circuit conduction so that a short-circuiting time where a welding voltage becomes 10V or less becomes over 30% to less than 60% per conduction cycle,
  where "t" is defined as the sheet thickness of the steel sheet with the thinnest sheet thickness among said plurality of steel sheets.

20. The arc spot welding apparatus according to claim 19, wherein said arc spot welding apparatus is a welding robot at which a welding torch and said backing plate are mounted.

* * * * *